US012744394B2

(12) United States Patent
Jeon et al.

(10) Patent No.: US 12,744,394 B2
(45) Date of Patent: Sep. 22, 2026

(54) ELECTRONIC DEVICE AND OPERATION METHOD OF ELECTRONIC DEVICE FOR PROVIDING FINDING FUNCTION

(71) Applicant: SAMSUNG ELECTRONICS CO., LTD., Suwon-si (KR)

(72) Inventors: Hyekyung Jeon, Suwon-si (KR); Yunguk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 611 days.

(21) Appl. No.: 18/312,046

(22) Filed: May 4, 2023

(65) Prior Publication Data

US 2023/0361577 A1 Nov. 9, 2023

Related U.S. Application Data

(63) Continuation of application No. PCT/KR2023/005976, filed on May 2, 2023.

(30) Foreign Application Priority Data

May 4, 2022 (KR) ........................ 10-2022-0055655
Aug. 9, 2022 (KR) ........................ 10-2022-0099484

(51) Int. Cl.
*H02J 7/42* (2026.01)
*H02J 7/34* (2006.01)
(Continued)

(52) U.S. Cl.
CPC ................ *H02J 7/42* (2026.01); *H02J 7/342* (2020.01); *H02J 7/751* (2026.01); *H02J 7/82* (2026.01); *H04R 1/1025* (2013.01)

(58) Field of Classification Search
CPC ...... H02J 7/42; H02J 7/342; H02J 7/82; H02J 7/751; H04R 1/1025
See application file for complete search history.

(56) References Cited

U.S. PATENT DOCUMENTS 11,791,646 B1 * 10/2023 Feng ........................ H02J 7/42 320/125
2015/0254962 A1 9/2015 Lee et al.
(Continued)

FOREIGN PATENT DOCUMENTS

CN 108683998 A 10/2018
CN 110768382 A 2/2020
(Continued)

OTHER PUBLICATIONS

1 Extended European Search Report dated May 12, 2025 issued in European Patent Application No. 23799651.7.
(Continued)

*Primary Examiner* — Carlos Amaya
(74) *Attorney, Agent, or Firm* — Nixon & Vanderhye, P.C.

(57) ABSTRACT

An example system includes a first device (first battery, first processor), a second device (second battery, second processor), and a charging case with a third battery, a boost circuit for charging the first and/or second device with power of the third battery, and a bypass circuit for directly supplying power from the third battery to the first and/or second device. The first processor identifies mounting on the charging case; identifies the first device as being a main electronic device based on the first device having a larger remaining battery capacity than the second device; transmits a first request signal to a first external device; based on response signal strength, switches to a lost mode to broadcast the request signal at a specified period; and transmits lost-mode information to the charging case. In response, the charging case connects the third battery to the bypass circuit to power the first device.

20 Claims, 15 Drawing Sheets

(51) Int. Cl.

| | |
|---|---|
| ***H02J 7/70*** | (2026.01) |
| ***H02J 7/82*** | (2026.01) |
| ***H04R 1/1025*** | (2026.01) |

(56) References Cited

U.S. PATENT DOCUMENTS

| | | | |
|---|---|---|---|
| 2016/0268833 | A1 | 9/2016 | Lee et al. |
| 2017/0264987 | A1 | 9/2017 | Hong et al. |
| 2021/0160955 | A1 | 5/2021 | Zhong |
| 2021/0249886 | A1 | 8/2021 | Moon et al. |
| 2021/0385637 | A1 | 12/2021 | Kontopidis et al. |
| 2022/0147130 | A1 | 5/2022 | Kim |
| 2022/0417645 | A1 | 12/2022 | Choi et al. |
| 2023/0187948 | A1 | 6/2023 | Jin et al. |
| 2023/0188942 | A1 | 6/2023 | Lee et al. |

FOREIGN PATENT DOCUMENTS

| | | | |
|---|---|---|---|
| CN | 112311029 | A | 2/2021 |
| CN | 113068114 | A | 7/2021 |
| JP | 2016-226080 | A | 12/2016 |
| KR | 20170105795 | A | 9/2017 |
| KR | 10-2019-0121449 | | 10/2019 |
| KR | 10-2021-0012766 | | 2/2021 |
| KR | 10-2244213 | | 4/2021 |
| KR | 10-2021-0101712 | | 8/2021 |
| KR | 20210102053 | A | 8/2021 |
| KR | 10-2021-0116118 | | 9/2021 |
| KR | 10-2022-0022707 | | 2/2022 |
| MY | 182572 | A | 1/2021 |
| WO | 2022/030845 | | 2/2022 |

OTHER PUBLICATIONS

Search Report and Written Opinion dated Aug. 4, 2023 issued in International Patent Application No. PCT/KR2023/005976.

Office Action dated Aug. 7, 2026 in Indian Application No. 202417083088 with English translation.

* cited by examiner

FIG. 1

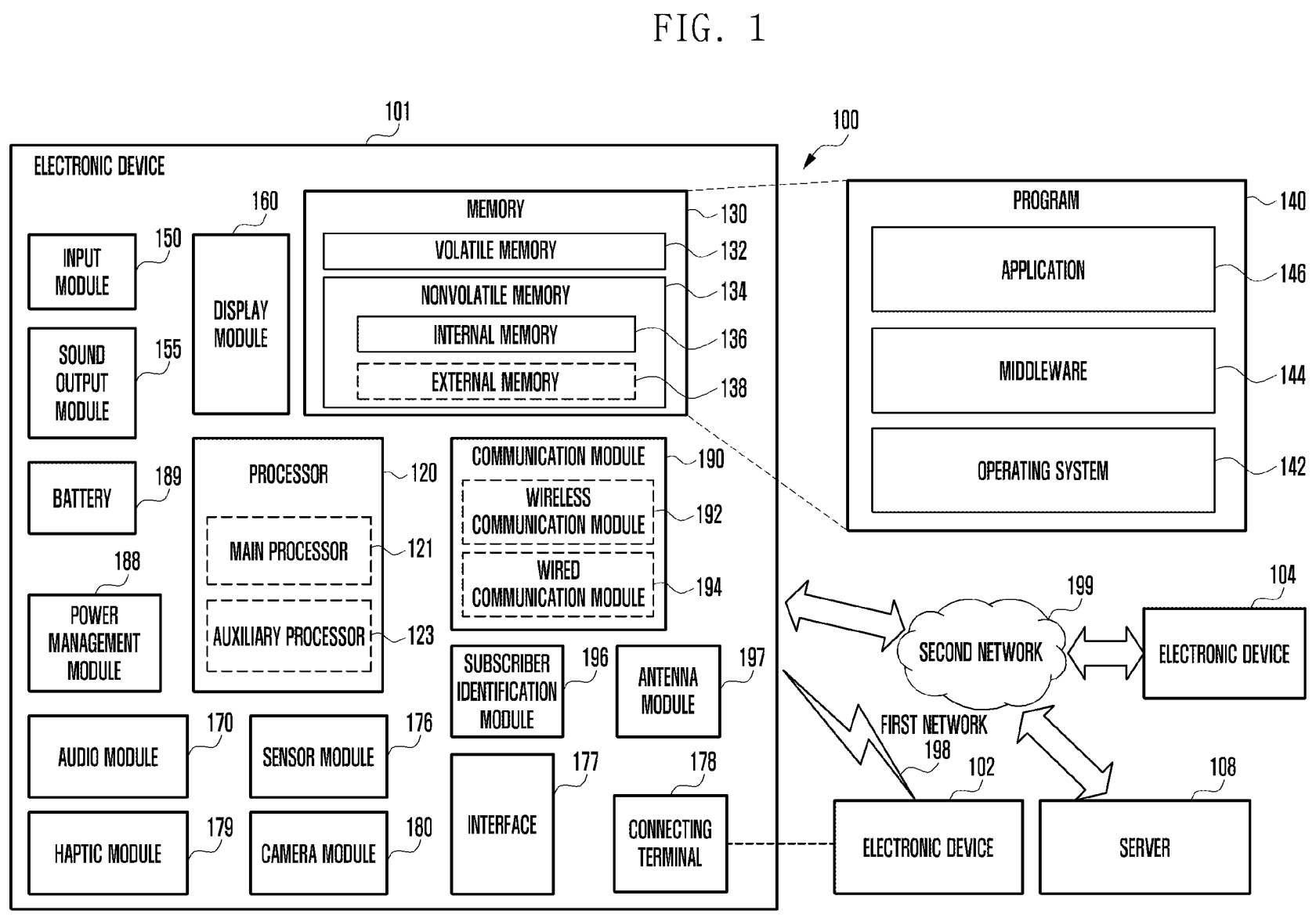

100
101 ELECTRONIC DEVICE
150 INPUT MODULE
155 SOUND OUTPUT MODULE
160 DISPLAY MODULE
130 MEMORY
132 VOLATILE MEMORY
134 NONVOLATILE MEMORY
136 INTERNAL MEMORY
138 EXTERNAL MEMORY
189 BATTERY
188 POWER MANAGEMENT MODULE
120 PROCESSOR
121 MAIN PROCESSOR
123 AUXILIARY PROCESSOR
190 COMMUNICATION MODULE
192 WIRELESS COMMUNICATION MODULE
194 WIRED COMMUNICATION MODULE
170 AUDIO MODULE
179 HAPTIC MODULE
176 SENSOR MODULE
180 CAMERA MODULE
196 SUBSCRIBER IDENTIFICATION MODULE
177 INTERFACE
197 ANTENNA MODULE
178 CONNECTING TERMINAL
140 PROGRAM
146 APPLICATION
144 MIDDLEWARE
142 OPERATING SYSTEM
199 SECOND NETWORK
198 FIRST NETWORK
104 ELECTRONIC DEVICE
108 SERVER
102 ELECTRONIC DEVICE

FIG. 2C

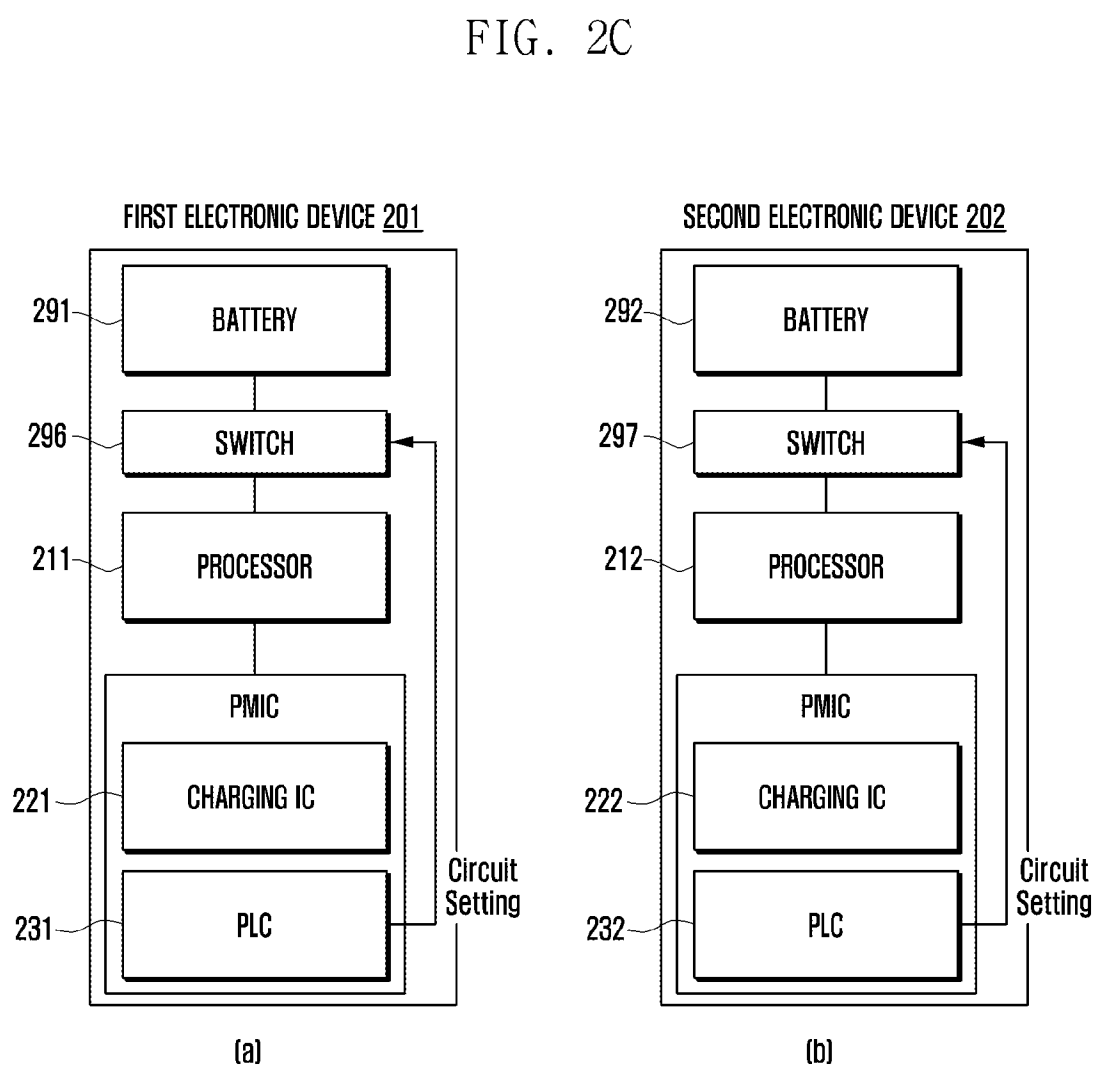

FIRST ELECTRONIC DEVICE 201

BATTERY
SWITCH
PROCESSOR
PMIC
CHARGING IC
PLC
Circuit Setting 291
296
211
221
231

(a)

SECOND ELECTRONIC DEVICE 202

BATTERY
SWITCH
PROCESSOR
PMIC
CHARGING IC
PLC
Circuit Setting 292
297
212
222
232

CHARGING CASE 300
PMIC
BYPASS CIRCUIT 310
BOOST CIRCUIT 320
LDO 330
TIMER 340
PLC 340
315 SWITCH
325 SWITCH
390 BATTERY

ELECTRONIC DEVICE 200
BATTERY 290
SWITCH 295
PROCESSOR 210
PMIC
CHARGING IC 220
PLC 230
Circuit Setting (b)

CHARGING CASE 300
PMIC
BYPASS CIRCUIT 310
BOOST CIRCUIT 320
LDO 330
TIMER 340
PLC 340
315 SWITCH
325 SWITCH
Circuit Setting
390 BATTERY ELECTRONIC DEVICE 200
BATTERY 290
SWITCH 295
PROCESSOR 210
PMIC
CHARGING IC 220
PLC 230

FIG. 6D
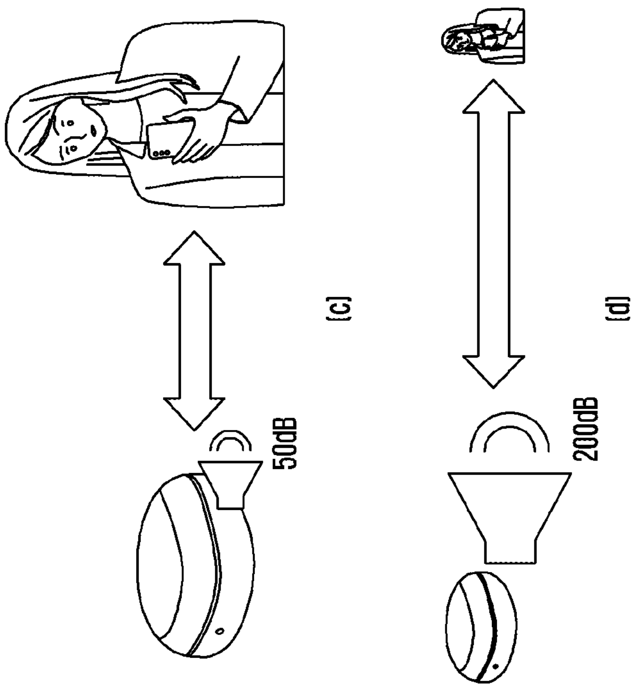
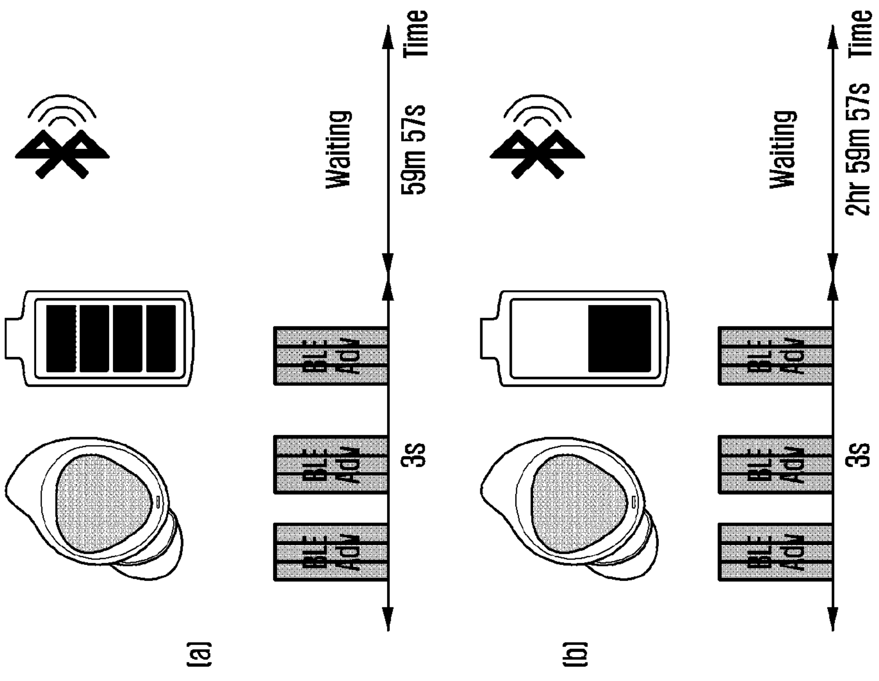

ELECTRONIC DEVICE AND OPERATION METHOD OF ELECTRONIC DEVICE FOR PROVIDING FINDING FUNCTION

CROSS-REFERENCE TO RELATED APPLICATIONS

This application is a continuation of International Application No. PCT/KR2023/005976 designating the United States, filed on May 2, 2023, in the Korean Intellectual Property Receiving Office, and claiming priority to Korean Patent Application No. 10-2022-0055655, filed on May 4, 2022, in the Korean Intellectual Property Office, and to Korean Patent Application No. 10-2022-0099484, filed on Aug. 9, 2022, in the Korean Intellectual Property Office, the disclosures of each of which are incorporated by reference herein in their entireties.

BACKGROUND

Field

The disclosure relates to an electronic device and an operation method of the electronic device for providing a finding function of the electronic device in the case that an electronic device is lost.

Description of Related Art

Because of the advancement of technology, various audio output devices that output audio on the basis of data received through wireless communication have been developed. Among these audio output devices, the wearable device that can exchange data by connecting Bluetooth communication with an external electronic device (e.g., smartphone, tablet, laptop, PC, or portable external electronic device) during short-range wireless communication and can configure the left and right devices without the wire, may be referred to as true wireless stereo (TWS, completely wireless earphones).

The wearable electronic device may contain a micro-sized coin battery inside and a separate charging case may be provided to charge and store the battery. Because the wearable electronic device is a small device, the battery capacity is limited, and the wearable electronic device can be charged by mounting a battery with a relatively large capacity in a charging case.

On the other hand, because a wearable electronic device is a miniaturized product, users are highly likely to lose it, and in case of losing it, it is difficult to find the device.

Because the finding function of the wearable electronic device transmits repeatedly a radio frequency (RF) signal at regular time intervals, power consumption may be high.

The wearable electronic device must recharge the power consumed by continuously transmitting RF signals to provide a finding function through the charging case, by which the usage time including the charging case may be reduced. In addition, the conventional wearable electronic device can operate only with a battery inside the wearable electronic device because of the circuit configuration and the method of receiving power from the charging case can be possible only through the charger integrated circuit (IC).

SUMMARY

Embodiments of the disclosure may increase the use time by implementing a reduction of the current consumption and provide a circuit capable of utilizing the battery power of charging case simultaneously with providing a function so that the user can find the location of the wearable electronic device in the case that a wearable electronic device (e.g., True Wireless Stereo (TWS)) is lost.

Objectives to be achieved in the disclosure are not limited to the aforementioned objectives, and other objectives not described above may be evidently understood from the following description by a person having ordinary knowledge in the art to which the disclosure pertains.

Additional aspects will be set forth in part in the following description, and in part will be apparent from the description, or can be understood by means of the examples presented.

A system according to an example embodiment may include: a first electronic device, a second electronic device, and a charging case, wherein the first electronic device includes a first battery and a first processor; the second electronic device includes a second battery and a second processor; and the charging case includes a third battery, a boost circuit configured to charge the first electronic device and/or the second electronic device with power of the third battery, and a bypass circuit configured to directly supply power from the third battery to the first electronic device and/or the second electronic device, wherein the first processor of the first electronic device may be configured to: identify whether the first electronic device and/or the second electronic device are/is mounted on the charging case; identify a remaining capacity of the first battery and the second battery in response to the identification of being mounted and determine the first electronic device having a larger remaining battery capacity as a main electronic device; transmit a first request signal to a first external electronic device; switch to a lost mode to broadcast a first request signal at a specified period in response to the strength of the first response signal received from the first external electronic device; and transmit information related to the lost mode to the charging case, the second electronic device may switch to a power saving mode in which the second electronic device does not perform an operation other than a designated function, and the charging case may be configured to connect the third battery and the bypass circuit based on information related to the lost mode and provide the power of the third battery to the first electronic device using the bypass circuit.

A method of operating an electronic device according to an example embodiment, where the electronic device system includes a first electronic device, a second electronic device and a charging case, may include: the first electronic device identifying whether the first electronic device and the second electronic device are mounted on the charging case; the first electronic device identifying the first battery of the first electronic device and the second battery of the second electronic device in response to the identification of being mounted and determining the first electronic device having a larger battery level as a main electronic device; the first electronic device transmitting a first request signal to a first external electronic device; the first electronic device switching to a lost mode to broadcast a first request signal at a specified period in response to the first response signal received from the first external electronic device being less than or equal to a specified value; the first electronic device transmitting information related to the lost mode to the charging case; the second electronic device switching to a power saving mode in which the second electronic device does not perform an operation other than a designated function; and the charging case connecting the third battery and the bypass circuit based on information related to the lost mode and providing the power of the third battery to the first electronic device using the bypass circuit.

An electronic device according to an example embodiment of the disclosure may reduce power consumption in providing a finding function.

An electronic device according to an example embodiment of the disclosure may operate with low power in a lost mode, thereby extending use time.

An electronic device according to an example embodiment of the disclosure may receive power efficiently by directly connecting a battery of a charging case to the electronic device through a bypass circuit.

In addition, various effects identified directly or indirectly through this disclosure may be provided.

BRIEF DESCRIPTION OF THE DRAWINGS

The above and other aspects, features and advantages of certain embodiments of the present disclosure will become more apparent from the following detailed description, taken in conjunction with the accompanying drawings, in which:

FIG. 1 is a block diagram illustrating an example electronic device in a network environment according to various embodiments;

FIG. 2C is a block diagram illustrating an example configuration of a first electronic device and a second electronic device according to various embodiments;

FIG. 5C is a diagram illustrating an example of a configuration connection relationship and a power flow of an electronic device and a charging case according to various embodiments;

FIG. 6D is a diagram illustrating an example in which an electronic device operates in a lost mode according to various embodiments;

Throughout the drawings, it will be understood that similar reference numbers refer to similar parts, components, and structures.

DETAILED DESCRIPTION

Figure 2A:
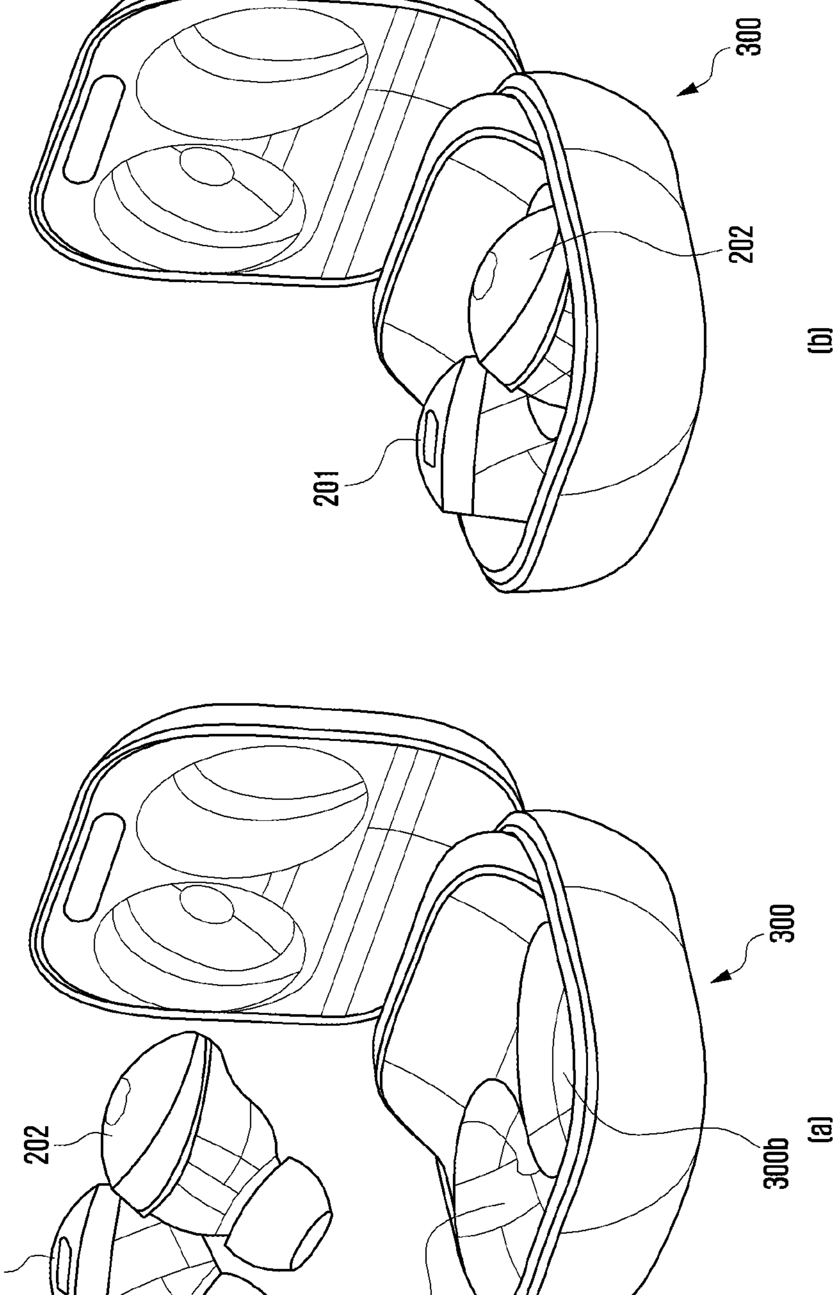
FIG. 2A is a diagram illustrating a first electronic device, a second electronic device, and a charging case according to various embodiments.

The following description with reference to the accompanying drawings is provided to aid in understanding of various example embodiments of the disclosure. It contains various specific details for illustrative purposes, but these should be regarded as illustrative only. Accordingly, those having ordinary knowledge in the art to which the disclosure pertains will recognize that various changes and modifications may be made to the example embodiments described herein without departing from the scope and spirit of the present disclosure. Also, descriptions of well-known functions and configurations may be omitted for clarity and conciseness.

The terms and words used in the following description and claims are not limited to their bibliographic meaning but may be used to enable a clear and consistent understanding of the present disclosure. Accordingly, it should be apparent to those having ordinary knowledge in the art to which the disclosure pertains that the following description of various example embodiments of the present disclosure is provided for a purpose of illustration only and not for limitation of the present disclosure.

Singular forms of expressions are to be understood as including plural referents unless the context clearly indicates otherwise. Thus, For example, reference to “a component surface” may include reference to one or more of such surfaces.

FIG. 1 is a block diagram illustrating an example electronic device 101 in a network environment 100 according to various embodiments.

With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thereto. The memory 130 may include the volatile memory 132 or the non-volatile memory 134.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, For example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, For example, a power management integrated circuit (PMIC).

The battery 189 may supply power to at least one component of the electronic device 101. According to an embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C” may include any one of, or all possible combinations of the items enumerated together in a corresponding one of the phrases. As used herein, such terms as “1$^{st}$” and “2$^{nd}$”, or “first” and “second” may be used to simply distinguish a corresponding component from another, and does not limit the components in other aspect (e.g., importance or order). It is to be understood that if an element (e.g., the first element) is referred to, with or without the term “operatively” or “communicatively”, as “coupled with”, “coupled to”, “connected with”, or “connected to” another element (e.g., the second element), the element may be coupled with the other element directly (e.g., wiredly), wirelessly, or via the third element.

As used in connection with various embodiments of the disclosure, the term “module” may include a unit implemented in hardware, software, or firmware, or any combination thereof, and may interchangeably be used with other terms, For example, “logic”, logic block”, “part”, or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program or another component may be carried out sequentially, in parallel, repeatedly, or heuristically, or one or more of the operations may be executed in a different order or omitted, or one or more other operations may be added.

FIG. 2A is a diagram illustrating a first electronic device 201, a second electronic device 202, and a charging case 300 according to various embodiments.

FIG. 2A (a) may illustrate a state in which a first electronic device 201 and a second electronic device 202 are not mounted on a charging case 300.

According to an embodiment, a first electronic device 201 may be mounted on a first position 300*a* of a charging case.

According to an embodiment, a second electronic device 202 may be mounted on a second position 300*b* of a charging case.

FIG. 2A (b) may illustrate a state in which a first electronic device 201 and a second electronic device 202 are mounted on a charging case 300.

A detailed description of a first electronic device 201, a second electronic device 202, and a charging case 300 will be described below.

Figure 2B:
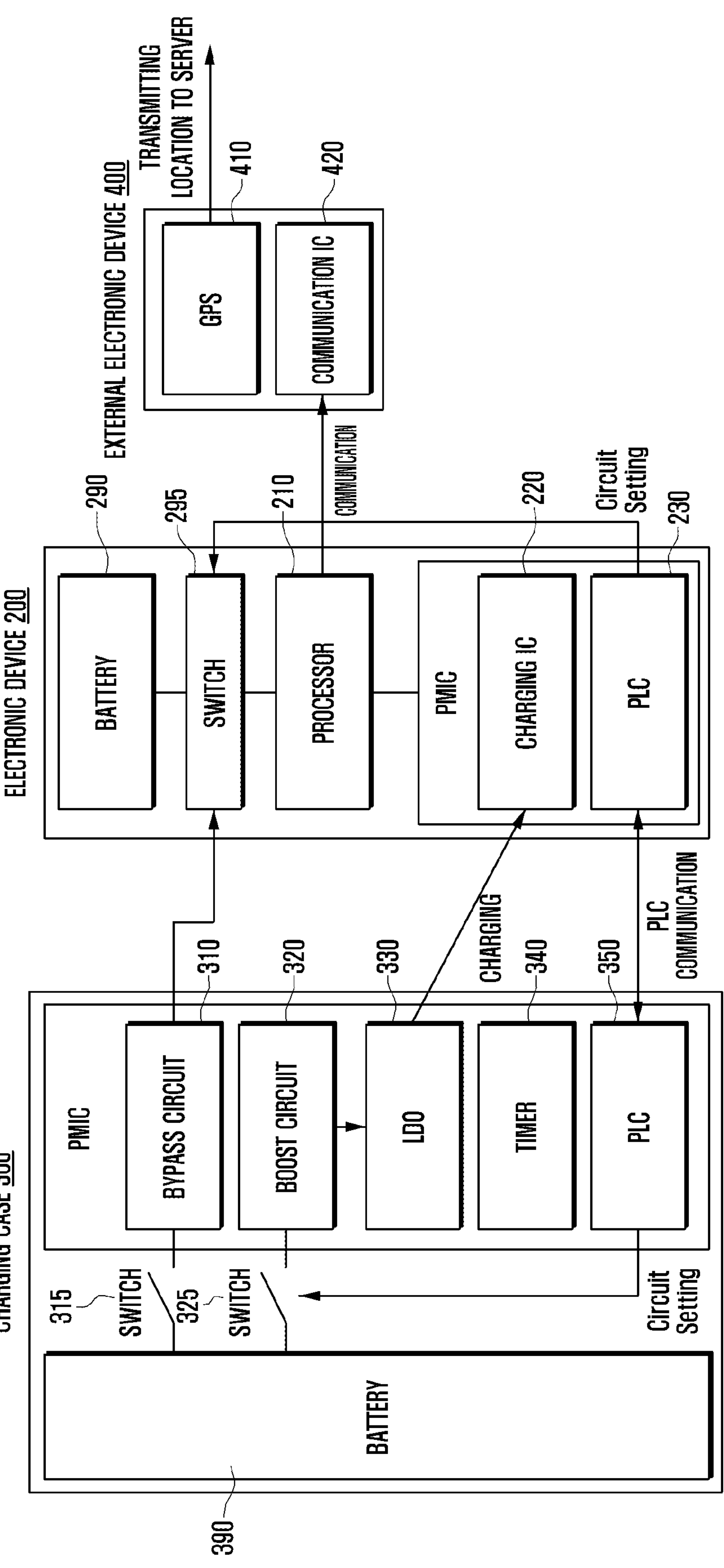
FIG. 2B is a block diagram illustrating an example configuration of a system according to various embodiments.

FIG. 2B is a block diagram illustrating an example configuration of a system according to various embodiments.

With reference to FIG. 2B, a system may include a charging case 300, an electronic device 200, and/or an external electronic device 400.

The charging case 300 according to an embodiment may include a battery 390, a bypass circuit 310, a boost circuit 320, a low dropout (LDO) 330, a timer 340, and/or a power line communication (PLC) circuit 350. The components included in FIG. 2B are for some of the components included in the electronic device 200, and the electronic device 200 may include various other components as shown in FIG. 1.

The battery 390 of the charging case according to an embodiment may supply a power to at least one component of the charging case 300 and/or an electronic device. For example, the charging case 300 may include a non-rechargeable primary battery, a rechargeable secondary battery, or a fuel cell.

The battery 390 of the charging case according to an embodiment may be connected to a bypass circuit 310 to directly supply power to the processor 210 of the electronic device 200, and/or may be connected to a boost circuit 320 and charge the battery 290 of the electronic device through the charger IC 220 of the electronic device 200.

The bypass circuit 310 according to an embodiment may be connected to the battery 390 of the charging case and/or the bypass circuit 250 of the electronic device 200. The bypass circuit 310 may be a circuit that supplies the power of the battery 390 of the charging case directly to components (e.g., the processor) of the electronic device 200. For example, the bypass circuit 310 may be connected to the battery 390 of the charging case in the case that the bypass switch 315 between the battery 390 of the charging case and the bypass circuit 310 is on, and it may supply the power of the battery 390 of the charging case to the electronic device 200.

The boost circuit 320 according to an embodiment may be connected to the battery 390 and/or the LDO 330 of the charging case. The boost circuit 320 may be a circuit that supplies power to the electronic device 200 with the power of the battery 390 of the charging case. For example, the boost circuit 320 may be connected electrically to the battery 390 of the charging case in the case that the boost switch 325 between the battery 390 of the charging case and the boost circuit 320 is on, and it may supply the power of the battery 390 of the charging case to the LDO 330.

The low dropout (LDO) 330 as a voltage regulator according to an embodiment may provide the power supplied from the battery 390 of the charging case to the charger IC 220 of the electronic device 200.

The timer 340 according to an embodiment may be activated at a predetermined period. For example, the timer 340 may be activated at a predetermined period so that the PLC transmits a wake-up signal to the electronic device 200.

The power line communication (PLC) circuit 350 according to an embodiment may perform power line communication (PLC) between the charging case 300 and the electronic device 200. For example, the PLC circuit 350 may transmit and/or receive information between the charging case 300 and the electronic device 200 via a power supply line.

The electronic device 200 according to an embodiment may include a battery 290, a processor (e.g., including processing circuitry) 210, a charger IC 220 and/or a PLC circuit 230 of the electronic device 200. The components included in FIG. 2B are for some of the components included in the electronic device 200, and the electronic device 200 may include various other components as shown in FIG. 1.

The first electronic device 201 and the second electronic device 202 indicated by the present disclosure may have substantially the same configuration as that of the electronic device 200.

The battery 290 of the electronic device 200 according to an embodiment may supply power to at least one component of the electronic device 200. For example, the battery 290 of the electronic device 200 may include a non-rechargeable primary battery, a rechargeable secondary battery, or a fuel cell.

According to an embodiment, the switch 295 may connect the battery 290 and the processor 210 of the electronic device 200 and/or the bypass circuit 310 of the charging case 300 and the processor 210. For example, the switch 295, as a single pole double throw (SPDT) switch, may be configured to be selectively connected to the processor 210 and the battery 290 of the electronic device 200, or to the processor 210 and the bypass circuit 310 of the charging case 300. In the case that the switch 295 connects the processor 210 and the bypass circuit 310 (bypass switch on), the processor 210 may receive power from the battery 390 of the charging case 300.

The processor 210 according to an embodiment may include various processing circuitry and control components of the electronic device 200. In an embodiment, the processor 210 may include a communication module (not shown) and communicate with an external electronic device (e.g., the external electronic device 400). For example, the processor may receive and/or transmit various information through a network (e.g., Bluetooth/Bluetooth Low Energy (BLE), Ultra Wideband (UWB), Wi-Fi, Zigbee, Z-wave, or Radio Frequency Identification (RFID)).

The charger IC 220 according to an embodiment may receive power from the LDO 330 of the charging case 300 and control charging of the battery 290 of the electronic device 200 on the basis of the supplied power.

The PLC circuit 230 according to an embodiment may perform power line communication (PLC) with the charging case 300. For example, the PLC circuit 230 may transmit and/or receive information to/from the PLC circuit 350 of the charging case 300 via a power supply power line or a terminal (e.g., a pogo pin).

The external electronic device 400 according to an embodiment may include a global positioning system (GPS) 410 and/or a communication IC 420. Components included in FIG. 2B are for some of components included in the external electronic device 400, and the external electronic device 400 may also include various other components as shown in FIG. 1.

According to an embodiment of the disclosure, a first external electronic device (e.g., the first external electronic device 401 of FIG. 4) and a second external electronic device (e.g., the second external electronic device 402 of FIG. 4) may have substantially the same configuration as that of the external electronic device 400.

The first external electronic device 401 according to an embodiment may be an electronic device having a pairing history with the electronic device 200 and may be a device registered with the same account as the electronic device 200 on a server.

The second external electronic device 402 according to an embodiment may be an electronic device that receives the first Tx signal broadcast from the electronic device 200 and may be a helper device that has agreed to provide the location of the electronic device.

A global pointing system (GPS) 410 according to an embodiment may determine the location of the external electronic device 400.

The communication IC 420 according to an embodiment may receive and/or transmit various information by communicating with the external device and/or the server through a network (e.g., Bluetooth/Bluetooth Low Energy (BLE), Ultra Wideband (UWB), Wi-Fi, Zigbee, Z-wave, or Radio Frequency Identification (RFID)). For example, the communication IC 420 may receive and/or transmit various information by communicating with the electronic device 200. For example, the communication IC 420 may receive and/or transmit various information by communicating with a server.

FIG. 2C is a block diagram illustrating an example configuration of a first electronic device 201 and a second electronic device 202 according to various embodiments.

The first electronic device 201 and the second electronic device 202 indicated by the present disclosure may have substantially the same configuration as that of the electronic device 200 of FIG. 2B.

The battery 291 of the first electronic device 201 and the battery 292 of the second electronic device 202 according to an embodiment may have configurations corresponding to the battery 290 of FIG. 2B.

The switch 296 of the first electronic device 201 and the switch 297 of the second electronic device 202 according to an embodiment may have a configuration corresponding to the switch 295 of FIG. 2B.

The processor 211 of the first electronic device 201 and the processor 212 of the second electronic device 202 according to an embodiment may have a configuration corresponding to the processor 210 of FIG. 2B.

The charger IC 221 of the first electronic device 201 and the charger IC 222 of the second electronic device 202 according to an embodiment may have a configuration corresponding to the charger IC 220 of FIG. 2B.

The PLC circuit 231 of the first electronic device 201 and the PLC circuit 232 of the second electronic device 202 according to an embodiment may have a configuration corresponding to the PLC circuit 230 of FIG. 2B.

Figure 3:
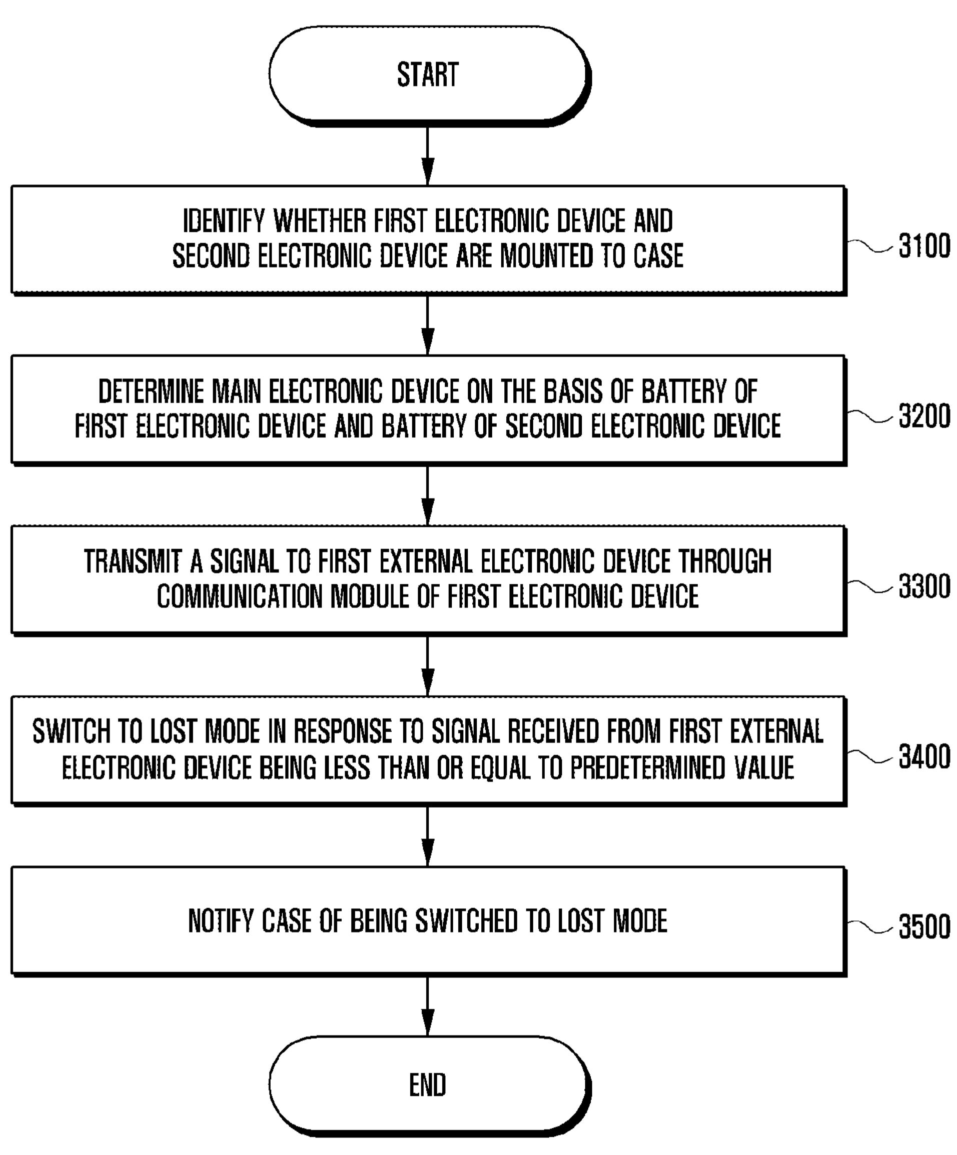
FIG. 3 is a flowchart illustrating an example method for a first electronic device to switch to a lost mode according to various embodiments.

FIG. 3 is a flowchart illustrating an example method for a first electronic device 201 (e.g., the first electronic device 201 of FIG. 2C) and/or a second electronic device 202 (e.g., the second electronic device 202 of FIG. 2C) to switch to a lost mode according to various embodiments.

The first electronic device 201 according to an embodiment, in operation 3100, may identify whether the first electronic device 201 is mounted on the charging case (e.g., the charging case 300 of FIG. 2B). The second electronic device 202 may identify whether the second electronic device 202 is mounted on the charging case 300.

According to an embodiment, the first electronic device 201 and/or the second electronic device 202 may apply a predetermined (e.g., specified) amount of current to the charging case 300, and the charging case 300 may determine whether the first electronic device 201 and/or the second electronic device 202 are/or mounted on the charging case 300 on the basis of the applied current. The charging case 300 may transmit information related to the first electronic device 201 and/or the second electronic device 202 being mounted on the charging case 300 to the first electronic device 201 and/or the second electronic device 202 through the PLC circuit 350. The first electronic device 201 and/or the second electronic device 202 according to an embodiment, in operation 3200, may determine the main electronic device on the basis of the battery (e.g., the battery 291 of the first electronic device 201 of FIG. 2C) information of the first electronic device and/or the battery (e.g., the battery 292 of the second electronic device 202 of FIG. 2C) information of the second electronic device.

According to an embodiment, in the lost mode, one of the first electronic device 201 and/or the second electronic device 202 may operate as a main electronic device, and the main electronic device may be a device that operates in an external electronic device communication mode and/or a lost mode.

According to an embodiment, the first electronic device 201 may transmit battery 291 information of the first electronic device to the second electronic device 202 through the PLC circuit 231 of the first electronic device 201. For example, the first electronic device 201 may transmit battery 291 information of the first electronic device to the charging case 300 using power line communication (PLC), and the charging case 300 may transmit battery 291 information of the first electronic device 201 to the second electronic device 202 using PLC communication.

According to an embodiment, the second electronic device 202 may transmit battery 292 information of the second electronic device 202 to the first electronic device 201 through the PLC circuit 232 of the second electronic device 202. For example, the second electronic device 202 may transmit battery 292 information of the second electronic device 202 to the charging case 300 using PLC communication and the charging case 300 may transmit battery 292 information of the second electronic device 202 to the first electronic device 201 using PLC communication.

According to an embodiment, the first electronic device 201 and/or the second electronic device 202 may compare battery 291 information of the first electronic device 201 and battery 292 information of the second electronic device 202 and determine the first electronic device 201 which has a larger remaining battery capacity as a main electronic device.

According to an embodiment, the first electronic device 201 determined as a main electronic device may activate an external electronic device communication mode for transmitting and receiving signals to/from the external electronic device 400. The second electronic device 202 that is not determined as the main electronic device may enter a low power mode in which power is saved by deactivating an operation other than a designated function.

The first electronic device 201 according to an embodiment, in operation 3300, may transmit a signal to the external electronic device 400 through the communication module.

According to an embodiment, the first electronic device 201 may transmit and/or receive a signal to/from the external electronic device 400 by activating an external electronic device communication mode.

For example, the first electronic device 201 may transmit a first Tx signal (e.g., Bluetooth/Bluetooth Low Energy (BLE), Ultra Wideband (UWB), Wi-Fi, Zigbee, Z-wave or Radio Frequency Identification (RFID)) to an external electronic device 400 through a communication module.

For example, the first electronic device 201 may receive a first Ack signal (e.g., Bluetooth/Bluetooth Low Energy (BLE), Ultra Wideband (UWB), Wi-Fi, Zigbee, Z-wave, or Radio Frequency Identification (RFID)).

The first electronic device 201 according to an embodiment, in operation 3400, may switch to the lost mode in response to the strength of the signal received from the external electronic device 400 being less than or equal to the predetermined value.

According to an embodiment, the first electronic device 201 may identify the strength (e.g., Received Signal Strength Indicator (RSSI)) of the first Ack signal received from the external electronic device 400 through the communication module. For example, the first electronic device 201 may activate the lost mode in response to the strength of the first Ack signal being less than or equal to the predetermined value.

A specific operation related to the lost mode will be described in greater detail below.

The first electronic device 201 according to an embodiment, in operation 3500, may notify the charging case 300 that it is switched to the lost mode.

According to an embodiment, the first electronic device 201 may transmit information related to the lost mode to the charging case 300 through a PLC circuit (e.g., the PLC circuit 231 of FIG. 2C). For example, information related to the lost mode may include a command (e.g., cmd) requesting that the charging case 300 switch to the bypass mode. For example, information related to the lost mode may include information related to the main electronic device.

Figure 4:
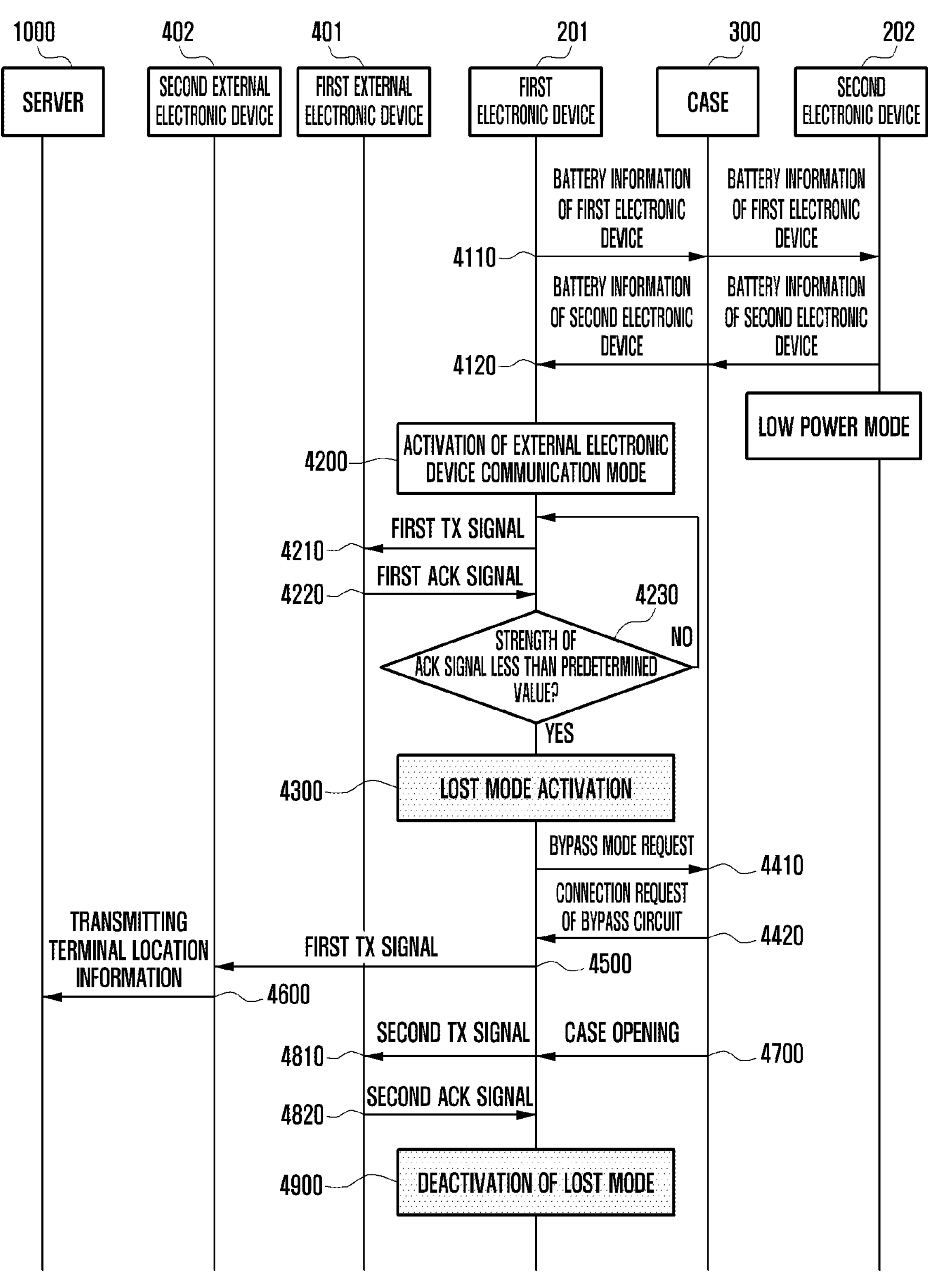
FIG. 4 is a signal flow diagram illustrating an example method for a system to operate in a lost mode according to various embodiments.

FIG. 4 is a signal flow diagram illustrating an example method for a system to operate in a lost mode according to various embodiments.

According to an embodiment, in operation 4110, the first electronic device 201 may transmit battery (e.g., the battery 291 of the first electronic device 201 of FIG. 2C) information of the first electronic device 201 to the second electronic device 202 through the PLC circuit (e.g., the PLC circuit 231 of the first electronic device 201 of FIG. 2C) of the first electronic device 201. For example, the first electronic device 201 may transmit battery 291 information of the first electronic device 201 to the charging case 300 using power line communication (PLC), and the charging case 300 may transmit battery 291 information of the first electronic device 201 to the second electronic device 202 using PLC communication.

According to an embodiment, the second electronic device 202, in operation 4120, may transmit battery 292 information of the second electronic device 202 to the first electronic device 201 through the PLC circuit (e.g., the PLC circuit 232 of the second electronic device 202 of FIG. 2C) of the second electronic device 202. For example, the second electronic device 202 may transmit battery 292 information of the second electronic device 202 to the charging case 300 using PLC communication, and the charging case 300 may transmit battery 292 information of the second electronic device 202 to the first electronic device 201 using PLC communication.

According to an embodiment, the first electronic device 201 and/or the second electronic device 202 may compare battery 291 information of the first electronic device 201 and battery 292 information of the second electronic device 202 and determine the first electronic device 201 which has a larger remaining battery capacity as a main electronic device. For example, in the case that the remaining capacity of the battery 291 of the first electronic device 201 is high, the first electronic device 201 may be determined as a main electronic device.

According to an embodiment, the first electronic device 201 determined as the main electronic device, in operation 4200, may activate an external electronic device communication mode for transmitting and receiving signals to/from the external electronic device 400. The second electronic device 202 that is not determined as a main electronic device may enter a low power mode in which power is saved by deactivating an operation other than a designated function.

The first electronic device 201 according to an embodiment, in operation 4210, may transmit the first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 through communication module (e.g., the communication module included in the processor 201 of the first electronic device of FIG. 2C).

The first external electronic device 401 according to an embodiment, in the case of receiving the first Tx signal, in operation 4220, may transmit the first Ack signal (e.g., Bluetooth/Bluetooth Low Energy (BLE), Ultra Wideband (UWB), Wi-Fi, Zigbee, Z-wave, or Radio Frequency Identification (RFID)) to the first electronic device 201.

The first electronic device 201 according to an embodiment, in operation 4230, may identify the strength of the signal received from the first external electronic device 401. For example, in operation 4230, the first electronic device 201 may identify whether the strength of the signal received from the first external electronic device 401 is less than or equal to the predetermined value. According to an embodiment, the first electronic device 201 may identify the strength (e.g., Received Signal Strength Indicator (RSSI)) of the first Ack signal received from the first external electronic device 401 through the communication module. For example, the first electronic device 201 may perform operations 4210 to 4230 repeatedly in the case that the strength of the first Ack signal is greater than the predetermined value.

The first electronic device 201 according to an embodiment, in operation 4300, may activate a lost mode in response to the strength of the first Ack signal being less than or equal to the predetermined value.

The first electronic device 201 according to an embodiment, may activate a lost mode in response to that the first electronic device 201 cannot transmit the first Tx signal to the first external electronic device 401 and/or cannot receive the first Ack signal from the first electronic device 201 in accordance with the fact that the first external electronic device 401 and the first electronic device 201 are located at a distance greater than or equal to a predetermined distance.

The first electronic device 201 according to an embodiment, in operation 4410, may transmit information related to the lost mode to the charging case 300.

For example, information related to the lost mode may include a command (e.g., cmd) requesting that the charging case 300 switch to the bypass mode. For example, information related to the lost mode may include information related to the main electronic device.

The charging case 300 according to an embodiment, in operation 4420, may connect the battery 390 of the charging case to a bypass circuit (e.g., the bypass circuit 310 of FIG. 2B) and request the first electronic device 201 to activate the bypass circuit 310 connection.

According to an embodiment, the charging case 300 may enable the battery 390 of the charging case to be connected to the bypass circuit 310 by activating a switch (e.g., the switch 315 of FIG. 2B) between the battery 390 of the charging case and the bypass circuit 310 (bypass switch on) and deactivating a switch (e.g., the switch 325 of FIG. 2B) between the battery 390 of the charging case and the boost circuit 320 (boost switch off).

According to an embodiment, the charging case 300 may transmit a request for activating the bypass circuit 310 connection to the first electronic device 201 through the PLC circuit 350 of the charging case.

The first electronic device 201 according to an embodiment may enable the switch (the switch 296 of FIG. 2C) to connect the bypass circuit 310 and the processor 211 in response to the bypass circuit 310 connection activation request.

The charging case 300 according to an embodiment may supply power to the first electronic device 201 in a bypass mode.

According to an embodiment, the charging case 300 may be connected to the first electronic device 201 through the bypass circuit 310. The charging case 300 may supply power from the battery 390 of the charging case 300 directly to the processor 210 of the first electronic device 201 through the bypass circuit 310.

According to an embodiment, in operation 4500, the first electronic device 201 may transmit the first Tx signal using the power supplied through the bypass circuit 310. For example, the first electronic device 201 may transmit the first Tx signal to the first external electronic device 401 and/or the second external electronic device 402 using the power supplied through the bypass circuit 310. For example, the first electronic device 201 may broadcast the first Tx signal using power supplied through the bypass circuit 310.

The first electronic device 201 according to an embodiment, in response to the fact that the battery 290 of the first electronic device 201 is greater than or equal to the predetermined value, may transmit the first Tx signal in the first signal transmission mode, and, in response to the fact that the battery 291 of the first electronic device 201 is less than the predetermined value, may transmit the first Tx signal in the second signal transmission mode. For example, the first transmission mode may be a mode for transmitting the first Tx signal in a first period, and the second transmission mode may be a mode for transmitting the first Tx signal in a second period. For example, the second period may be longer than the first period.

The first electronic device 201 according to an embodiment may perform operation 4500 repeatedly.

The second external electronic device 402 according to various embodiments, in operation 4600, may provide information related to the location of the second external electronic device 402 to the server 1000 in response to receiving the first Tx from the first electronic device 201. The charging case 300 according to an embodiment, in operation 4700, may detect an opening of the charging case 300 and provide related information to the first electronic device 201. For example, the charging case 300 may detect the opening of the charging case 300 in the case that the user finds the lost charging case 300 and opens it.

The first electronic device 201 according to an embodiment, in operation 4810, may transmit a second Tx signal (e.g., Bluetooth) to the first external electronic device 401 through the communication module in response to the opening of the charging case 300.

The first external electronic device 401 according to an embodiment, in operation 4820, may transmit a second Ack signal (e.g., Bluetooth) to the first electronic device 201.

The first electronic device 201 according to an embodiment, in operation 4900, may deactivate the lost mode in response to receiving the second Ack signal from the first external electronic device 401 through the communication module.

Figure 5A:
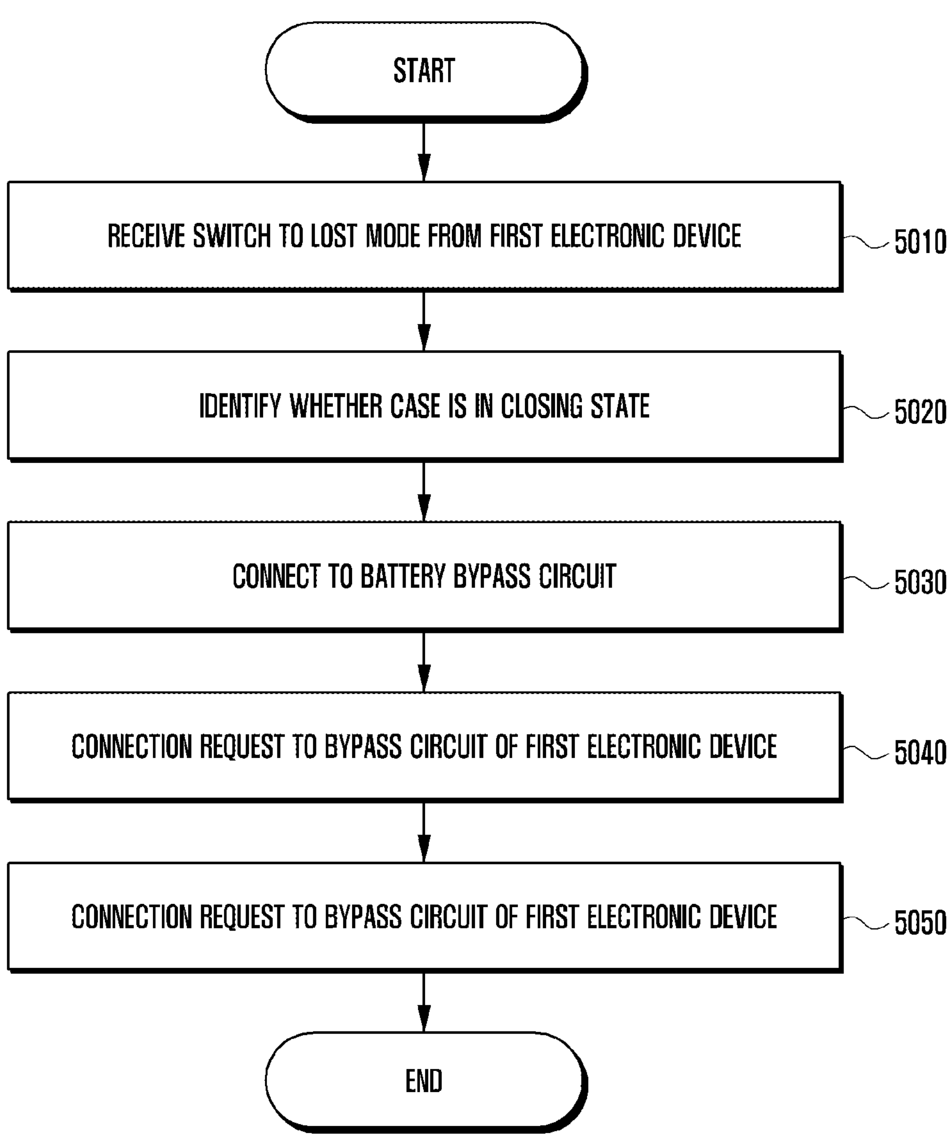
FIG. 5A is a flowchart illustrating an example method for a charging case to operate as a bypass mode in a lost mode according to various embodiments.

FIG. 5A is a flowchart illustrating an example method for a charging case (e.g., the charging case 300 of FIG. 2B) to operate as a bypass mode in a lost mode according to various embodiments.

According to an embodiment, the bypass mode may be a mode for the charging case 300 to supply the power of the battery (e.g., the battery 390 of the charging case of FIG. 2B) directly to the first electronic device (e.g., the first electronic device 201 of FIG. 2C) through the bypass circuit (e.g., the bypass circuit 310 of FIG. 2B).

An example method according to an embodiment may be an operation after operation 3500 of FIG. 3.

The charging case 300 according to an embodiment, in operation 5010, may receive information related to the lost mode from the first electronic device 201.

According to an embodiment, the charging case 300 may receive information related to the lost mode from the first electronic device 201 through a PLC circuit (e.g., the PLC circuit 350 of the charging case 300 of FIG. 2B). For example, information related to the lost mode may include a command (e.g., cmd) requesting that the charging case 300 switch to the bypass mode. For example, information related to the lost mode may include information related to the main electronic device.

The charging case 300 according to an embodiment, in operation 5020, may identify whether the charging case 300 is in a closed state.

According to an embodiment, the charging case 300 may identify whether the charging case 300 is in a closed state using a sensor module (not shown). For example, the sensor module may include at least one of a magnet, a hall sensor, a proximity sensor, and a capacitive sensor, and it may recognize the opening and closing of the case 300.

The charging case 300 according to an embodiment, in operation 5030, may connect electrically the battery 390 of the charging case 300 to the bypass circuit 310.

According to an embodiment, the charging case 300 may enable the battery 390 of the charging case 300 to be connected to the bypass circuit 310 electrically by activating a switch 315 between the battery 390 of the charging case 300 and the bypass circuit 310 (bypass switch on) and deactivating a switch 325 between the battery 390 of the charging case 300 and the boost circuit (e.g., the boost circuit 320 of FIG. 2*b*) (boost switch off).

The charging case 300 according to an embodiment, in operation 5040, may request the first electronic device 201 to activate the bypass circuit 310 connection.

According to an embodiment, the charging case 300 may transmit a request for activating the bypass circuit 310 connection to the first electronic device 201 through the PLC circuit 350 of the charging case 300.

The first electronic device 201 according to an embodiment may enable the switch (the switch 296 of FIG. 2C) to connect the bypass circuit 310 and the processor 210 in response to the bypass circuit 310 connection activation request.

The charging case 300 according to an embodiment, in operation 5050, may supply power to the first electronic device 201 in a bypass mode.

According to an embodiment, the charging case 300 may be connected to the first electronic device 201 through the bypass circuit 310. The charging case 300 may supply power from the battery 390 of the charging case 300 directly to the processor 210 of the first electronic device 201 through the bypass circuit 310.

According to an embodiment, the processor 210 of the first electronic device 201 may transmit the first Tx signal using power supplied through the bypass circuit 310.

Figure 5B:
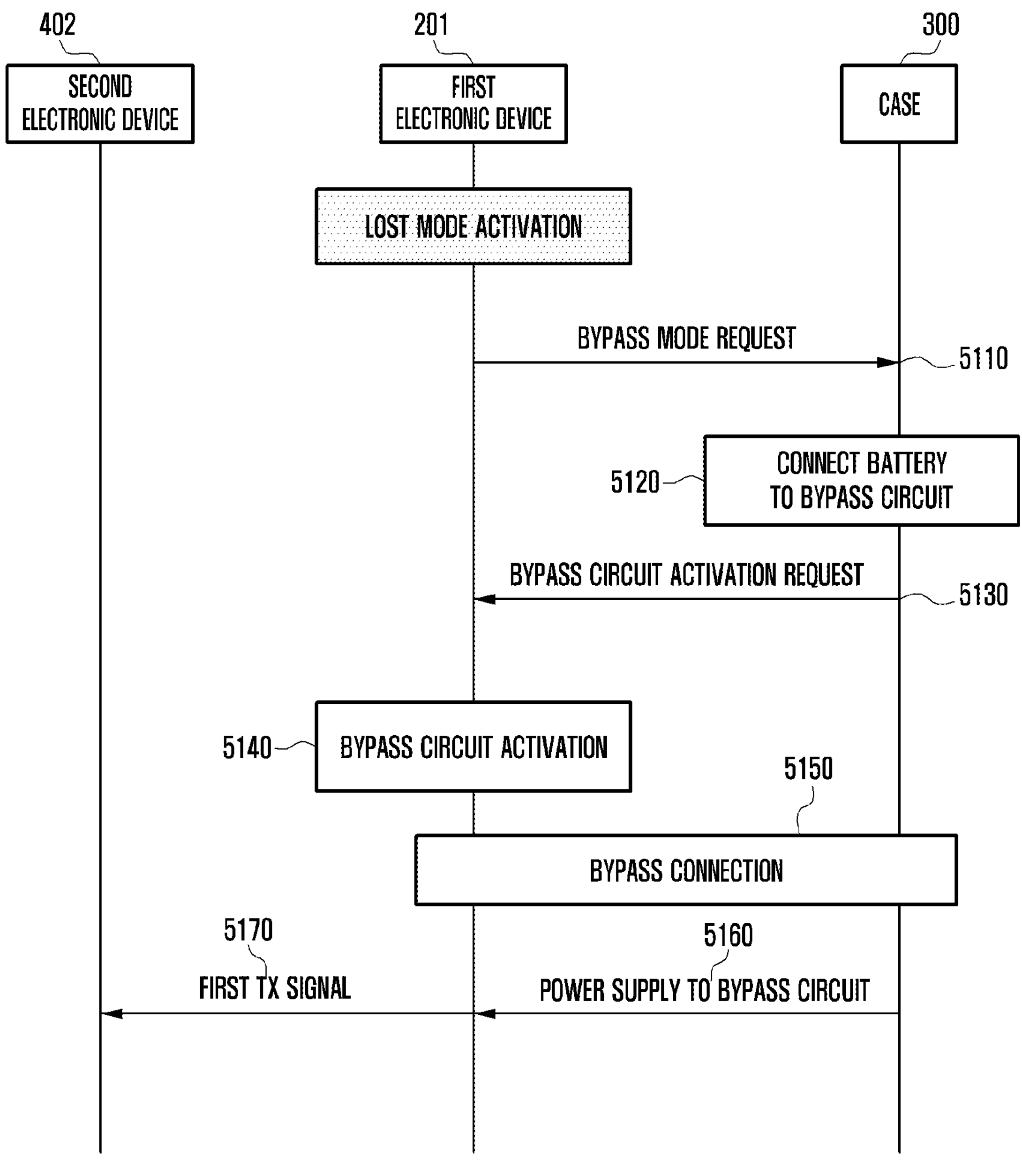
FIG. 5B is a signal flow diagram illustrating an example method for a first electronic device and a charging case to operate in a lost mode according to various embodiments.

FIG. 5B is a signal flow diagram illustrating an example method for a first electronic device 201 and a charging case 300 to operate in a lost mode according to various embodiments. According to an embodiment, FIG. 5B is a signal flow diagram created assuming that the first electronic device 201 among the first electronic device 201 and the second electronic device 202 is determined as the main electronic device.

The first electronic device 201 according to an embodiment may activate a lost mode.

The first electronic device 201 according to an embodiment, in operation 5110, may transmit information related to the lost mode to the charging case 300.

According to an embodiment the first electronic device 201 may transmit information related to the lost mode to the charging case 300 through the PLC circuit 231 of the first electronic device 201. For example, information related to the lost mode may include a command (e.g., cmd) requesting that the charging case 300 switch to the bypass mode. For example, information related to the lost mode may include information related to the main electronic device.

The charging case 300 according to an embodiment, in operation 5120, may connect the battery 390 of the charging case 300 to the bypass circuit 310.

According to an embodiment, the charging case 300 may enable the battery 390 of the charging case 300 to be connected electrically to the bypass circuit 310 by activating a switch 315 between the battery 390 of the charging case 300 and the bypass circuit 310 (bypass switch on) and deactivating a switch 325 between the battery 390 of the charging case 300 and the boost circuit 320 (boost switch off).

The charging case 300 according to an embodiment, in operation 5130, may request the first electronic device 201 to activate the bypass circuit 310 connection.

According to an embodiment, the charging case 300 may transmit a request for activating the bypass circuit 310 connection to the first electronic device 201 through the PLC circuit 350 of the charging case 300.

The first electronic device 201 according to an embodiment, in operation 5140, may activate the bypass circuit 310 connection.

According to an embodiment, the first electronic device 201 may enable a switch 296 to connect electrically the processor 210 and the bypass circuit 310.

The first electronic device 201 and the charging case 300 according to an embodiment, in operation 5150, may be connected to the bypass mode.

For example, the bypass mode may be a mode for the battery 390 of the charging case 300 and the first electronic device 201 to be connected to the bypass circuit 310 so that power of the battery 390 of the charging case 300 may be supplied directly to the first electronic device 201.

The charging case 300 according to an embodiment, in operation 5160, may supply power to the first electronic device 201 in a bypass mode.

According to an embodiment, the charging case 300 may supply power from the battery 390 of the charging case 300 directly to the processor 210 of the first electronic device 201 through the bypass circuit 310.

The first electronic device 201 according to an embodiment, in operation 5170, may transmit a first Tx signal using the power supplied through the bypass circuit 310. For example, the first electronic device 201 may transmit the first Tx signal to the first external electronic device 401 and/or the second external electronic device 402 using the power supplied through the bypass circuit 310. For example, the first electronic device 201 may broadcast the first Tx signal using power supplied through the bypass circuit 310.

According to an embodiment, the first electronic device 201 and the charging case 300 may perform operations 5160 and 5170 repeatedly.

Figure 5C:
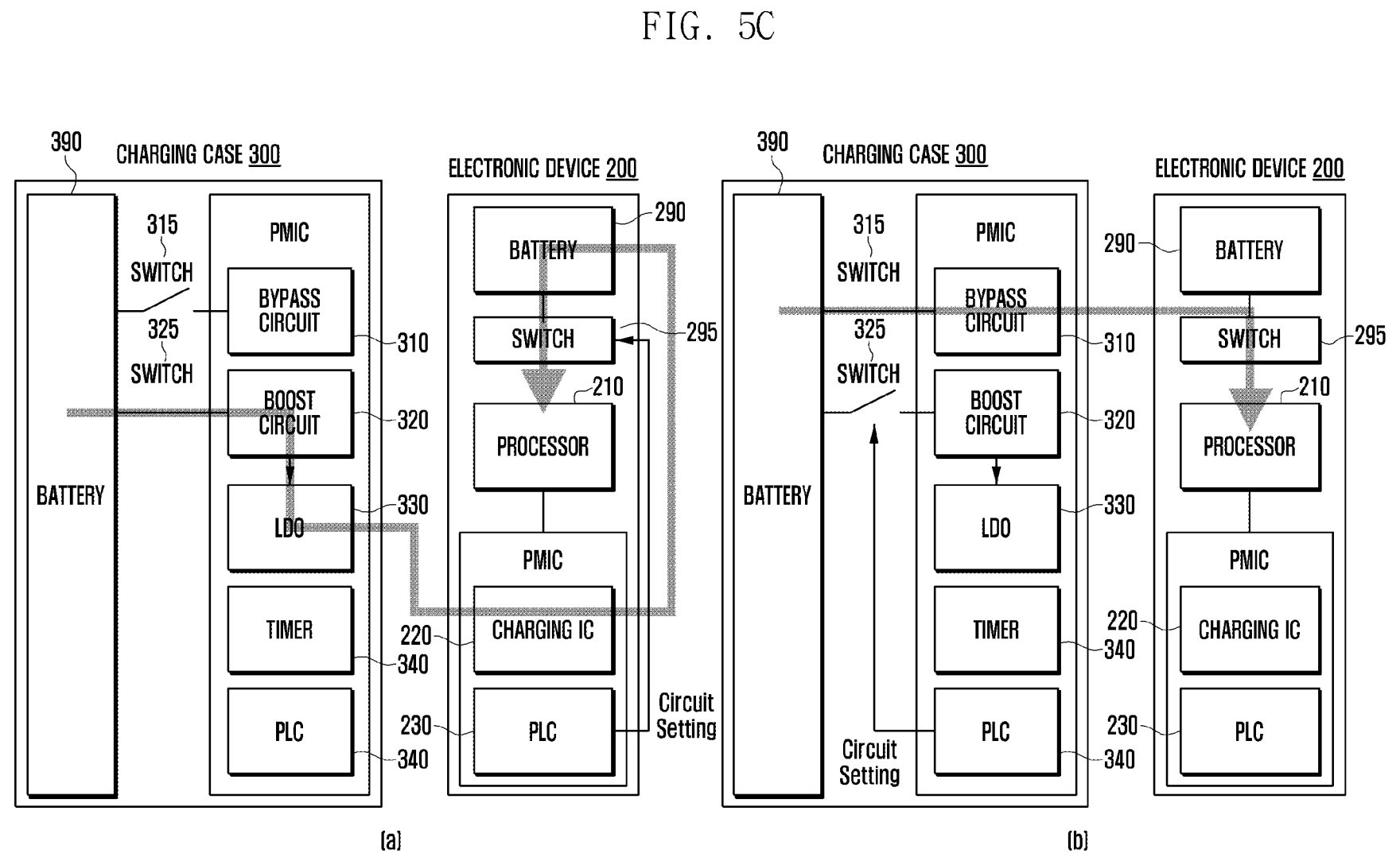

FIG. 5C is a diagram illustrating an example of a configuration connection relationship and a power flow of the electronic device 200 and a charging case 300 according to various embodiments.

FIG. 5C (a) is a diagram illustrating a connection relationship between components and a flow of power in the case that the charging case 300 charges the electronic device 200 using the boost circuit 320.

With reference to FIG. 5C (a), the switch 325 between the battery 390 of the charging case 300 and the boost circuit 320 may be activated and the battery 390 of the charging case 300 may be in a state to be connected electrically to the boost circuit 320, and the switch 295 of the electronic device 200 may be in a state to connect the battery 290 of the electronic device 200 and the processor 210 electrically.

According to an embodiment, the battery 390 of the charging case 300 may supply power to the boost circuit 320, and the boost circuit 320 may supply power to the LDO 330.

According to an embodiment, the LDO 330 of the charging case 300 may charge the battery 290 of the electronic device 200 by supplying power to the charger IC of the electronic device 200.

According to an embodiment, the charged battery 290 of the electronic device 200 may supply power to the processor 210.

According to an embodiment, the processor 210 of the electronic device 200 may transmit the first Tx signal using power supplied from the battery 290 of the electronic device 200.

FIG. 5C (b) is a diagram illustrating the connection relationship between components and the flow of power in a lost mode in which the charging case 300 supplies power to the electronic device 200 using the bypass circuit 310.

With reference to FIG. 5C (b), the switch 315 between the battery 390 of the charging case 300 and the bypass circuit 310 may be activated and the battery 390 of the charging case 300 may be in a state to be connected electrically to the bypass circuit 310, and the switch 295 of the electronic device 200 may be in a state to connect the bypass circuit 310 and the processor 210 electrically.

The charging case 300 and the electronic device 200 may be connected in a bypass mode, and the battery 390 of the charging case 300 may supply power directly to the processor 210 of the electronic device 200 through the bypass circuit 310.

The processor 210 of the electronic device 200 may transmit the first Tx signal using power supplied from the battery 390 of the charging case 300 through the bypass circuit 310.

Figure 6A:
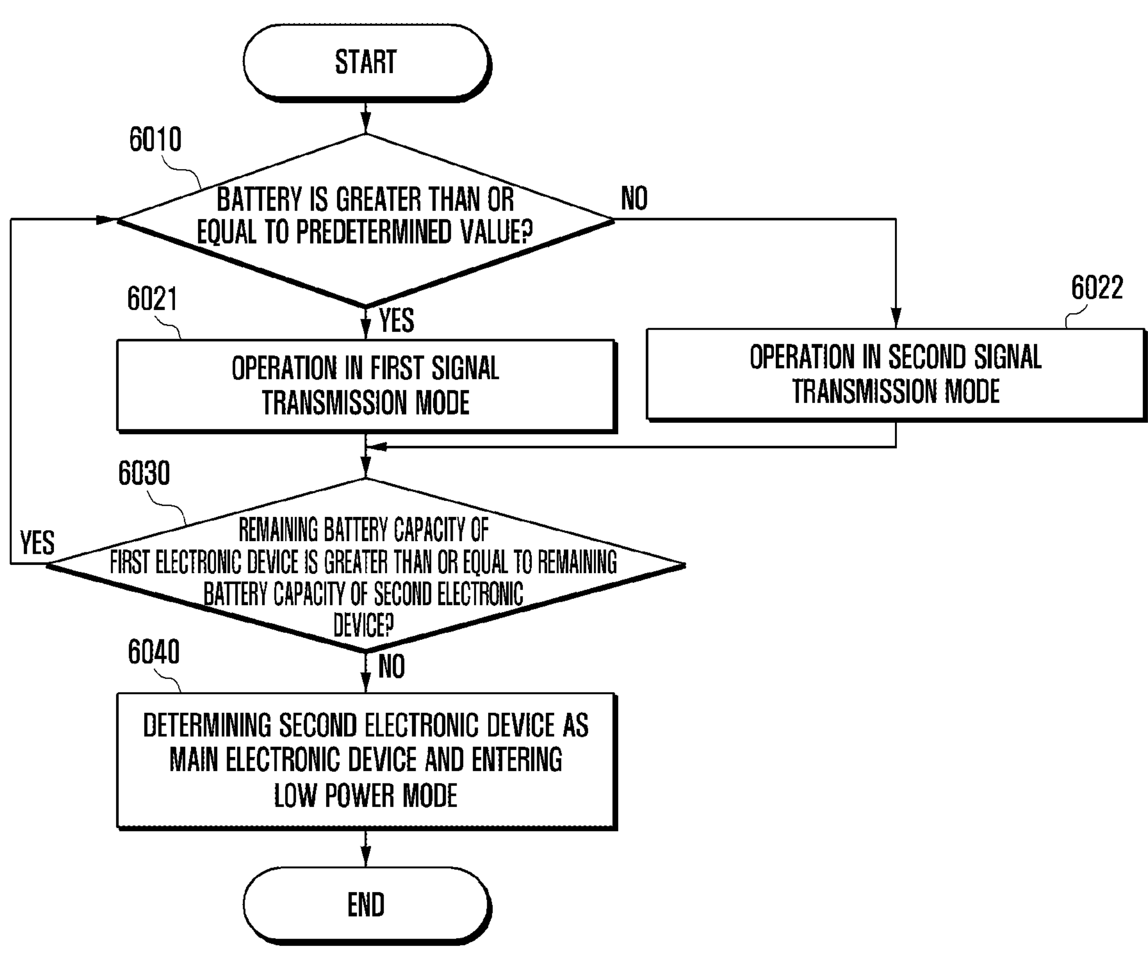
FIG. 6A is a flowchart illustrating an example method of operating a first electronic device transmitting a signal in accordance with a remaining battery capacity in a lost mode according to various embodiments.

FIG. 6A is a flowchart illustrating an example method of operating a first electronic device (e.g., the first electronic device 201 of FIG. 2C) transmitting a signal in accordance with a remaining battery (e.g., the battery 291 of the first electronic device 201 of FIG. 2C) capacity in a lost mode according to an embodiment. For example, it is a flowchart created assuming that the first electronic device 201 among the first electronic device 201 and the second electronic device 202 is determined as the main electronic device.

An operating method according to an embodiment may be an operation after operation 3400 of FIG. 3 in which the first electronic device 201 operates in the lost mode.

For example, the main electronic device may be the first electronic device 201.

The first electronic device 201 according to an embodiment, in operation 6010, may identify whether the remaining capacity of the battery 291 of the first electronic device 201 is greater than or equal to the predetermined value.

The first electronic device 201 according to an embodiment, in operation 6021, may operate in the first signal transmission mode in response to the remaining capacity of the battery 291 of the first electronic device 201 being greater than or equal to the predetermined value (operation 6010—yes).

For example, the first transmission mode may be a mode for transmitting the first Tx signal in a first period. For example, the first electronic device 201 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a first period through the communication module. For example, the first electronic device 201 may broadcast the first Tx signal in a first period through the communication module.

The first electronic device 201 according to an embodiment, in operation 6022, may operate in the second signal transmission mode in response to the remaining capacity of the battery 290 of the first electronic device 201 being less than the predetermined value (operation 6010—no).

For example, the second transmission mode may be a mode for transmitting the first Tx signal in a second period. For example, the second period may be longer than the first period. For example, the first electronic device 201 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a second period through the communication module. For example, the first electronic device 201 may broadcast the first Tx signal in a second period through the communication module.

The first electronic device 201 according to an embodiment, in operation 6030, may identify whether the remaining capacity of the battery 291 of the first electronic device 201 is greater than or equal to the remaining capacity of the battery 292 of the second electronic device 202.

According to an embodiment, the first electronic device 201 may transmit battery 291 information of the first electronic device 201 to the second electronic device 202 through the PLC circuit 231 of the first electronic device 201. For example, the first electronic device 201 may transmit battery 291 information of the first electronic device 201 to the charging case 300 using PLC communication, and the charging case 300 may transmit the battery 291 information of the first electronic device 201 to the second electronic device 202 using PLC communication.

According to an embodiment, the second electronic device 202 may transmit battery 292 information of the second electronic device 202 to the first electronic device 201 through the PLC circuit 232 of the second electronic device 202. For example, the second electronic device 202 may transmit battery 292 information of the second electronic device to the charging case 300 using PLC communication, and the charging case 300 may transmit battery 292 information of the second electronic device 202 to the first electronic device 201 through PLC communication.

According to an embodiment, the first electronic device 201 may restart from operation 6010 in response to the remaining capacity of the battery 291 of the first electronic device 201 greater than or equal to the remaining capacity of the battery 292 of the second electronic device 202 (operation 6030—yes).

According to an embodiment, the first electronic device 201 may restart from operation 6010 in response to the remaining capacity of the battery 291 of the first electronic device 201 being equal to the remaining capacity of the battery 292 of the second electronic device 202 (operation 6030— yes).

The first electronic device 201 according to an embodiment may determine the main electronic device by a designated method in response to the remaining capacity of the battery 291 of the first electronic device 201 being equal to the remaining capacity of the battery 292 of the second electronic device 202. For example, the designated method may include predetermining a priority among the first electronic device 201 or the second electronic device 202.

The first electronic device 201 according to an embodiment, in operation 6040, may determine the second electronic device 202 as a main electronic device and enter a low power mode in response to the remaining amount of the battery 291 of the first electronic device being less than the remaining amount of the battery 292 of the second electronic device (operation 6030—no). According to an embodiment, the second electronic device 202 determined as the main electronic device may switch to the lost mode and perform operation 6010.

Figure 6B:
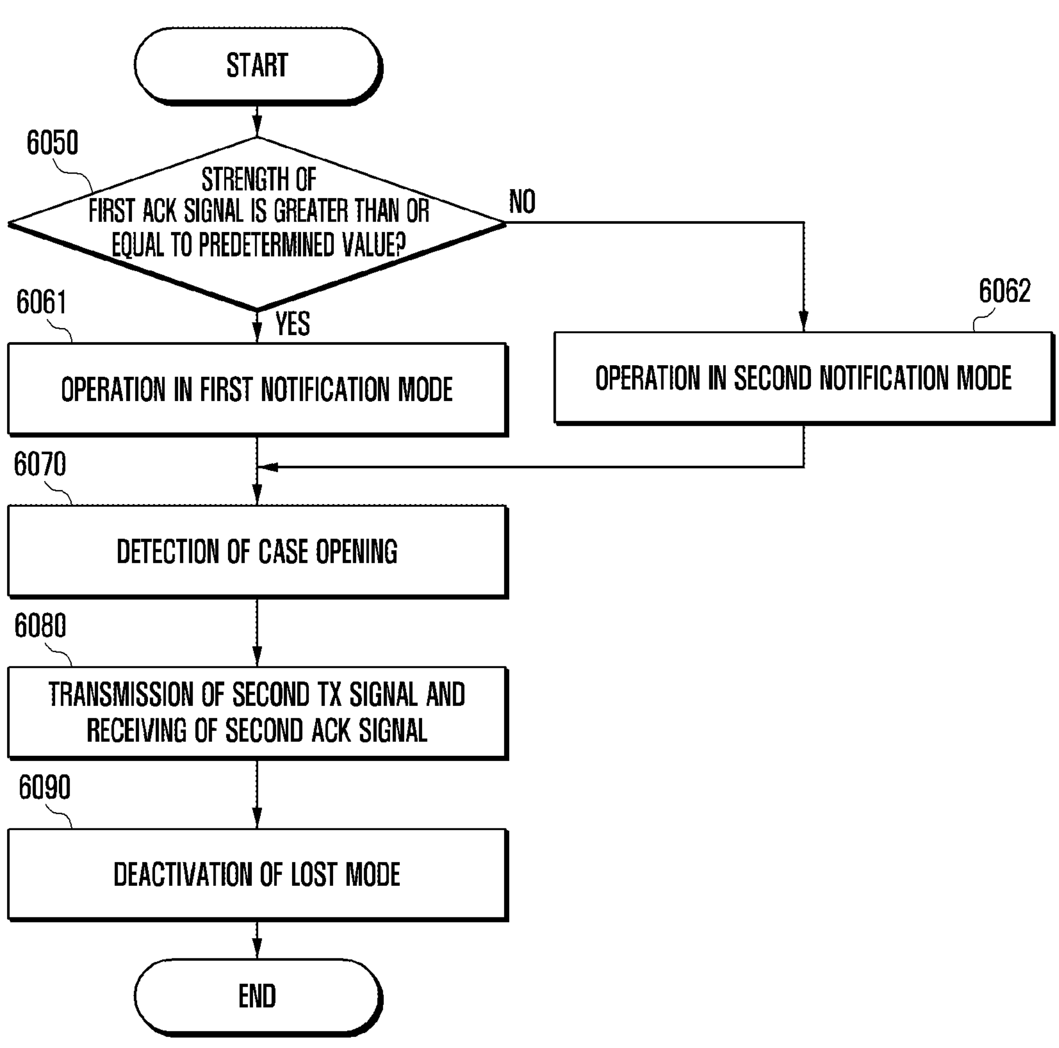
FIG. 6B is a flowchart illustrating an example method for a first electronic device to operate a notification in accordance with the strength of a signal received from an external electronic device according to various embodiments.

FIG. 6B is a flowchart illustrating an example method for the first electronic device 201 to operate a notification in accordance with the strength of a signal received from the first external electronic device 401 according to various embodiments.

An operating method according to an embodiment may be an operation after operation 3400 in FIG. 3 in which the first electronic device 201 operates in the lost mode.

For example, the main electronic device may be the first electronic device 201.

The first electronic device 201 according to an embodiment may receive a first Ack signal from the first external electronic device 401 through the communication module.

The first electronic device 201 according to an embodiment, in operation 6050, may determine whether the strength of the first Ack signal received from the first external electronic device 401 is greater than or equal to the predetermined value.

According to an embodiment, the first electronic device 201 may identify the signal strength (e.g., Received Signal Strength Indicator (RSSI)) of the first Ack received from the first external electronic device 401 through the communication module.

The first electronic device 201 according to an embodiment, in operation 6061, may operate in a first notification mode in response to the signal strength being greater than or equal to the predetermined value (operation 6050—yes).

For example, the first notification mode may be a mode in which an alarm is output with a sound of a first decibel.

For example, the first electronic device 201 may output an alarm with a sound of the first decibel in response to the distance between the first electronic device 201 and the first external electronic device 401 being less than the predetermined distance because the strength of the signal received from the first external electronic device 401 is greater than or equal to the predetermined value.

The first electronic device 201 according to an embodiment, in operation 6062, may operate in a second notification mode in response to the signal strength being less than the predetermined value (operation 6050—no).

For example, the second notification mode may be a mode in which an alarm is output with a second decibel sound. For example, the second decibel may be greater than the first decibel.

For example, the first electronic device 201 may output an alarm with a sound of the second decibel greater than the first decibel in response to the distance between the first electronic device 201 and the first external electronic device 401 being greater than or equal to the predetermined distance because the strength of the signal received from the first external electronic device 401 is less than the predetermined value.

The first electronic device 201 according to an embodiment, in operation 6070, may detect the opening of the charging case 300.

According to an embodiment, the first electronic device 201 may receive information related to the opening of the charging case 300 from the charging case 300 through the PLC circuit 231 of the first electronic device 201.

The first electronic device 201 according to an embodiment, in operation 6080, may transmit a second Tx signal and receive a second Ack signal.

For example, the first electronic device 201 may transmit a second Tx signal (e.g., Bluetooth) to the first external electronic device 401 through the communication module.

For example, the first electronic device 201 may receive a second Ack signal (e.g., Bluetooth) from the first external electronic device 401 through the communication module.

The first electronic device 201 according to an embodiment, in operation 6090, may deactivate the lost mode.

The first electronic device 201 according to an embodiment may deactivate the lost mode in response to receiving the second Ack signal from the first external electronic device 401 through the communication module.

Figure 6C:
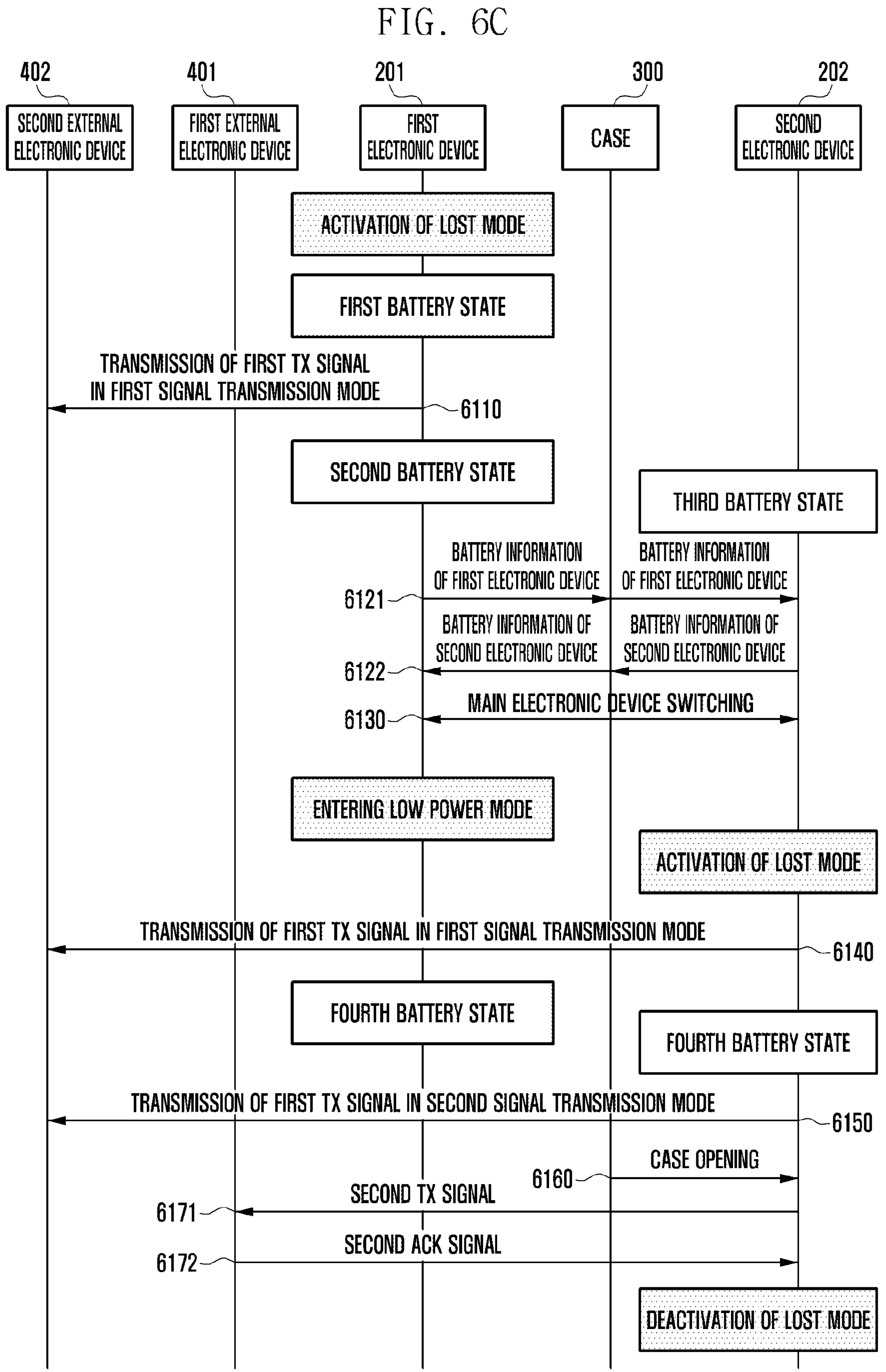
FIG. 6C is a signal flow diagram illustrating an example operation of the system in a lost mode according to various embodiments.

FIG. 6C is a signal flow diagram illustrating an example of how the system operates in a lost mode according to various embodiments.

The first electronic device 201 according to an embodiment may activate a lost mode.

The first electronic device 201 may be in a first battery state, and the first battery state may be a state in which the remaining battery capacity is greater than or equal to the predetermined value. (e.g., operation 6010)

The first electronic device 201 according to an embodiment, in operation 6110, may operate in the first signal transmission mode.

For example, the first transmission mode may be a mode for transmitting the first Tx signal in a first period. For example, the first electronic device 201 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a first period through the communication module. For example, the first electronic device 201 may broadcast the first Tx signal in a first period through the communication module.

The first electronic device 201 according to an embodiment may perform operation 6110 repeatedly.

The remaining battery capacity of the first electronic device 201 according to an embodiment may become a second battery state in accordance with operation 6110.

The first electronic device 201 according to an embodiment may identify whether a difference between the remaining capacity of the battery 291 of the first electronic device and the remaining capacity of the battery 292 of the second electronic device is greater than or equal to a predetermined range.

The first electronic device 201 according to an embodiment may compare battery 291 information of the first electronic device 201 and battery 292 information of the second electronic device 202. For example, the first electronic device 201 may compare battery 291 information of the first electronic device 201 and battery 292 information of the second electronic device 202 at each designated period. For example, in the case that the remaining capacity of the battery 291 of the first electronic device 201 is less than or equal to the predetermined value, the first electronic device 201 may compare battery 291 information of the first electronic device 201 and battery 292 information of the second electronic device 202.

According to an embodiment, in operation 6121, the first electronic device 201 may transmit battery 291 information of the first electronic device 201 to the second electronic device 202 through the PLC circuit 231 of the first electronic device 201. For example, the first electronic device 201 may transmit battery 291 information of the first electronic device 201 to the charging case 300 using PLC communication, and the charging case 300 may transmit battery 291 information of the first electronic device 201 to the second electronic device 202 using the PLC communication.

According to an embodiment, the second electronic device 202, in operation 6122, may transmit battery 292 information of the second electronic device 202 to the first electronic device 201 through the PLC circuit 232 of the second electronic device 202. For example, the second electronic device 202 may transmit battery 292 information of the second electronic device 202 to the charging case 300 using PLC communication, and the charging case 300 may transmit battery 292 information of the second electronic device 202 to the first electronic device 201 using PLC communication.

The first electronic device 201 according to an embodiment, in operation 6130, may determine the second electronic device 202 as the main electronic device and enter the low power mode in response to the remaining capacity (second battery state) of the battery 291 of the first electronic device 201 being less than the remaining capacity (third battery state) of the second electronic device 292.

According to an embodiment, the second electronic device 202 determined as the main electronic device may switch to the lost mode.

For example, the second electronic device 202 may be in a third battery state. For example, the third battery state may be a state in which the remaining battery capacity is greater than or equal to the predetermined value.

According to an embodiment, in operation 6140, the second electronic device 202 may operate in the first signal transmission mode.

The first electronic device 201 according to an embodiment may perform operation 6140 repeatedly.

The remaining capacity of the battery 292 of the second electronic device 202 according to an embodiment may become a fourth battery state in accordance with operation 6140.

For example, the fourth battery state may be a state in which the remaining battery capacity is less than the predetermined value.

The second electronic device 202 according to an embodiment, in operation 6150, may operate in the second signal transmission mode in response to the battery 292 of the second electronic device 202 being less than the predetermined value (fourth battery state).

For example, the second transmission mode may be a mode for transmitting the first Tx signal in a second period. For example, the second period may be longer than the first period. For example, the second electronic device 202 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a second period through the communication module. For example, the second electronic device 202 may broadcast the first Tx signal through the communication module.

The second electronic device 202 according to an embodiment may perform operation 6150 repeatedly.

The charging case 300 according to an embodiment, in operation 6160, may detect the opening of the charging case 300 and transmit information related to the opening of the charging case 300 to the second electronic device 202 through the PLC circuit 350 of the charging case 300.

The second electronic device 202 according to an embodiment, in operation 6171, may transmit a second Tx signal (e.g., Bluetooth) to the first external electronic device 401 through the communication module.

The first external electronic device 401 according to an embodiment, in operation 6172, may transmit a second Ack signal (e.g., Bluetooth) to the second electronic device 202 through the communication module.

The second electronic device 202 according to an embodiment may deactivate the lost mode in response to receiving the second Ack signal from the first external electronic device 401 through the communication module.

FIG. 6D is a diagram illustrating an example in which the electronic device 200 operates in a lost mode according to various embodiments.

FIGS. 6D(a) and 6D(b) are diagrams illustrating examples in which the electronic device 200 transmits a signal according to the remaining capacity of the battery 290 of the electronic device 200 in the lost mode.

With reference to FIG. 6D (a), the electronic device 200 may operate in the first transmission mode in response to the battery 290 of the electronic device 200 being greater than or equal to the predetermined value.

In an embodiment, the first transmission mode may be a mode for transmitting the first Tx signal in a first period. For example, the electronic device 200 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a first period through the communication module. For example, the electronic device 200 may broadcast the first Tx signal in a first period through the communication module.

For example, the first transmission mode may be a mode in which a signal is transmitted for 3 seconds every hour repeating transmitting the signal for 3 seconds after waiting for 59 minutes and 57 seconds.

With reference to FIG. 6D (b), the electronic device 200 may operate in the second signal transmission mode in response to the battery 290 of the electronic device 200 being less than the predetermined value.

In an embodiment, the second transmission mode may be a mode for transmitting the first Tx signal to the first external electronic device 401 and/or the second external electronic device 402 in a second period. For example, the second period may be longer than the first period. For example, the electronic device 200 may transmit a first Tx signal (e.g., Bluetooth/Bluetooth Low Energy (BLE), Ultra Wideband (UWB), Wi-Fi, Zigbee, Z-wave, or Radio Frequency Identification (RFID)) to the first external electronic device 401 and/or the second external electronic device 402 in a second period through the communication module. For example, the electronic device 200 may broadcast the first Tx signal in a second period through the communication module.

For example, the second transmission mode is a mode in which a signal is transmitted for 3 seconds every 3 hours repeating transmitting the signal for 3 seconds after waiting for 2 hours and 59 minutes and 57 seconds.

FIGS. 6D(c) and 6D(d) are diagrams illustrating examples of operating a notification in accordance with the strength of the first Ack signal that the electronic device 200 receives from the first external electronic device 401.

With reference to FIG. 6D (c), the electronic device 200 may operate in a first notification mode in response to the strength of the first Ack signal received from the first external electronic device 401 being greater than or equal to the predetermined value.

In an embodiment, the first notification mode may be a mode in which an alarm is output with a sound of a first decibel (e.g., 50 dB).

For example, the electronic device 200 may output an alarm with a sound of the first decibel in response to the distance between the electronic device 200 and the first external electronic device 401 being less than the predetermined distance because the strength of the first Ack signal received from the first external electronic device 401 is greater than or equal to the predetermined value.

With reference to FIG. 6D (d), the electronic device 200 may operate in a second notification mode in response to the strength of the first Ack signal received from the first external electronic device 401 being less than the predetermined value.

In an embodiment, the second notification mode may be a mode in which an alarm is output with a sound of a second decibel (e.g., 200 dB). For example, the second decibel may be bigger than the first decibel.

For example, the electronic device 200 may output an alarm with a sound of the second decibel greater than the first decibel in response to the distance between the electronic device 200 and the first external electronic device 401 being greater than or equal to the predetermined distance because the strength of the first Ack signal received from the first external electronic device 401 is less than the predetermined value.

Figure 7A:
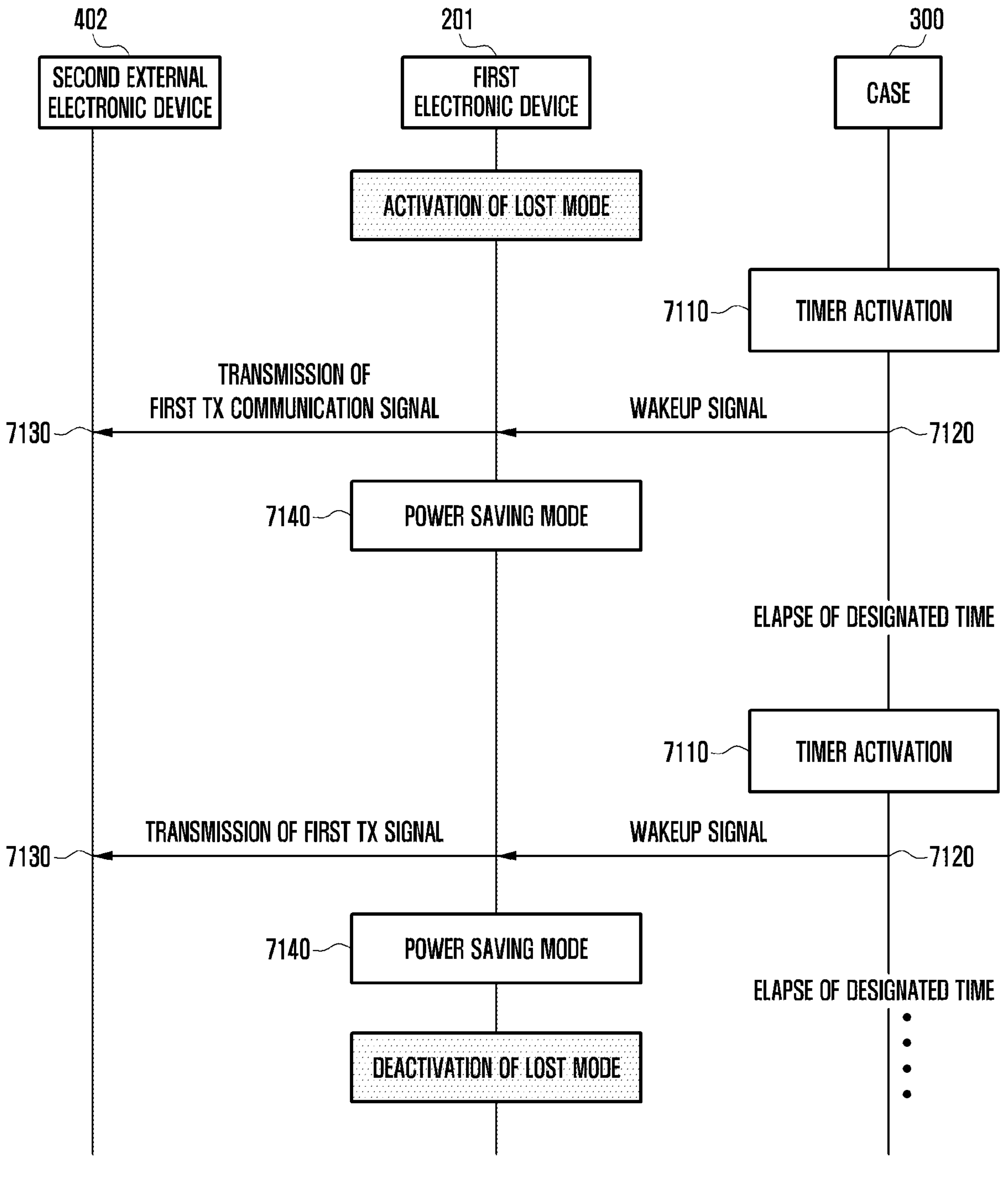
FIG. 7A is a signal flow diagram illustrating an example method for a charging case and a first electronic device to operate using a timer in a lost mode according to various embodiments.

FIG. 7A is a signal flow diagram illustrating an example method for the charging case 300 and the first electronic device 201 to operate using a timer 340 in a lost mode according to various embodiments.

An operating method according to an embodiment may be an operation after operation 3400 of FIG. 3 in which the first electronic device 201 operates in the lost mode.

In this embodiment, the main electronic device may be the first electronic device 201.

The charging case 300 according to an embodiment, in operation 7110, may activate a timer (e.g., the timer 340 of FIG. 2*b*).

The timer 340 according to an embodiment may be activated at a designated period.

The charging case 300 according to an embodiment, in operation 7120, may transmit a wakeup signal to the first electronic device 201.

The timer according to an embodiment after being activated, may enable the PLC circuit (e.g., the PLC circuit 350 of FIG. 2*b*) of the charging case 300 to transmit a wakeup signal to the first electronic device 201.

The first electronic device 201 according to an embodiment, in operation 7130, may transmit (e.g., broadcasting) a first Tx signal in response to receiving the wakeup signal from the charging case 300.

The first electronic device 201 according to an embodiment, in operation 7140, may switch to a power saving mode.

The first electronic device 201 according to an embodiment may enter a power saving mode in which an operation other than a designated function is deactivated after transmitting (e.g., broadcasting) the first Tx signal.

The charging case 300 according to an embodiment may perform operation 7110 after a predetermined time elapses.

The timer 340 according to an embodiment may be activated after a predetermined time elapses.

The charging case 300 and the first electronic device 201 according to an embodiment may perform operations 7110 to 7140 repeatedly until the first electronic device 201 deactivates the lost mode.

Figure 7B:
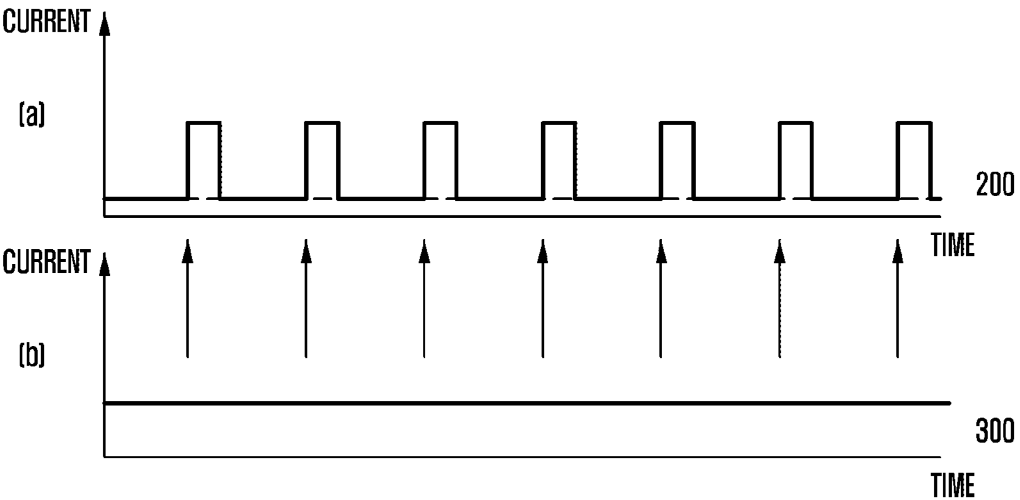
FIG. 7B is a diagram illustrating a current graph in the case that the system operates using a timer in a lost mode according to various embodiments.

FIG. 7B is a diagram illustrating a current graph in the case that the system operates using a timer 340 in a lost mode according to various embodiments.

Graph (a) is a diagram illustrating a current graph of the main electronic device (e.g., the first electronic device 201) and Graph (b) is a diagram illustrating a current graph of the charging case 300.

With reference to FIG. 7B (b), the timer 340 of the charging case 300 may be activated at a designated period.

The charging case 300 according to an embodiment, may transmit a wakeup signal to the electronic device 200.

With reference to FIG. 7B (b), the main electronic device may be activated in response to receiving a wake-up signal from the charging case 300. The activated main electronic device may transmit (e.g., broadcast) the first Tx signal.

The electronic device 200 according to an embodiment may enter a power saving mode in which an operation other than a designated function is deactivated after transmitting the first Tx signal to the second external electronic device 402.

The timer 340 according to an embodiment may be activated after a predetermined time elapses, and it may repeat the above operation.

A system according to an example embodiment may include a first electronic device, a second electronic device, and a charging case, wherein the first electronic device includes a first battery and a first processor; the second electronic device includes a second battery and a second processor; and the charging case includes a third battery, a boost circuit configured to charge the first electronic device and/or the second electronic device with power of the third battery, and a bypass circuit configured to directly supply power from the third battery to the first electronic device and/or the second electronic device, wherein the first processor of the first electronic device may be configured to: identify whether the first electronic device and/or the second electronic device are/is mounted on the charging case; identify the remaining capacity of the first battery and the second battery in response to the identification of being mounted and determine the first electronic device having a larger remaining battery capacity as a main electronic device; transmit a first request signal to a first external electronic device; switch to a lost mode to broadcast a first request signal at a specified period in response to the strength of the first response signal received from the first external electronic device; and transmit information related to the lost mode to the charging case, the second electronic device may be configured to switch to a power saving mode in which the second electronic device does not perform an operation other than a designated function, and the charging case may be configured to connect the third battery and the bypass circuit based on information related to the lost mode and to provide the power of the third battery to the first electronic device using the bypass circuit.

In the system according to an example embodiment, the charging case may include further a power line communication (PLC) circuit, the first electronic device may include a PLC circuit, and information may be transmitted and received through the PLC circuit of the first electronic device and the PLC circuit of the charging case.

In the system according to an example embodiment, the first electronic device may include a switch configured to selectively connect the processor of the first electronic device and the first battery, or configured to connect the processor of the first electronic device and the bypass circuit, and the charging case may request the first electronic device to activate a connection between a processor of the first electronic device and the bypass circuit and supply power of the third battery to the processor through the bypass circuit in response to the activation of the connection.

In the system according to an example embodiment, the first electronic device may be configured to broadcast a first request signal using power of the third battery.

In the system according to an example embodiment, the first electronic device may be configured to: identify whether the first battery is greater than or equal to the specified value, broadcast a first request signal in a first period in response to being greater than or equal to the specified value, and broadcast the first request signal in a second period in response to being less than the specified value.

In the system according to an example embodiment, the first electronic device may be configured to: reidentify the first battery and the second battery, determine the second electronic device as a main electronic device in response to the remaining capacity of the second battery being greater than or equal to the remaining capacity of the first battery, and switch to a power saving mode in which the second electronic device does not perform an operation other than a designated function in a lost mode, wherein the second electronic device may be configured to switch to a lost mode in which a first request signal is broadcast at a designated period.

In the system according to an example embodiment, the first electronic device may be configured to: receive a first response signal from the first external electronic device, identify whether the strength of the first response signal received from the first external electronic device is greater than or equal to the specified value, output an alarm with a first decibel in response to being greater than or equal to the specified value, and output an alarm with a second decibel in response to being less than the specified value, wherein the first decibel may be less than the second decibel.

In the system according to an example embodiment, the first electronic device may be configured to receive information related to the opening of the charging case from the charging case, transmit a second request signal to the first external electronic device, and deactivate the lost mode in response to receiving the second response signal from the first external electronic device.

In the system according to an example embodiment, the charging case may further include a timer, the timer may be configured to be activated at every designated period and transmit a wakeup signal to the first electronic device, and the first electronic device may be configured to be activated in response to receiving the wakeup signal, broadcast the first request signal, and enter power saving mode after broadcasting the signal.

In the system further including a second external electronic device according to an embodiment, the second external electronic device may be configured to transmit information related to the location of the second external electronic device to the server in response to receiving the first request signal broadcast by the first electronic device.

A method of operating an electronic device according to an example embodiment, where the electronic device system includes a first electronic device, a second electronic device and a charging case, may include: the first electronic device identifying whether the first electronic device and the second electronic device are mounted on the charging case; the first electronic device identifying the first battery of the first electronic device and the second battery of the second electronic device in response to the identification of being mounted and determining the first electronic device having a larger battery level as a main electronic device; the first electronic device transmitting a first request signal to a first external electronic device; the first electronic device switching to a lost mode to broadcast a first request signal at a specified period in response to the first response signal received from the first external electronic device being less than or equal to the specified value; the first electronic device transmitting information related to the lost mode to the charging case; the second electronic device switching to a power saving mode in which the second electronic device does not perform an operation other than a designated function; wherein the charging case connecting the third battery and the bypass circuit based on information related to the lost mode and providing the power of the third battery to the first electronic device using the bypass circuit.

In the method according to an example embodiment, the first electronic device may include further transmitting and receiving information through a PLC circuit of the first electronic device and a PLC circuit of the charging case.

In the method according to an example embodiment, the first electronic device may include further a switch selectively connecting the processor of the first electronic device and the first battery, or the processor of the first electronic device and the bypass circuit, and the charging case may include further requesting the first electronic device to activate the connection between a processor of the first electronic device and the bypass circuit and supplying power of the third battery to the processor through the bypass circuit in response to the activation of the connection.

In the method according to an example embodiment, the first electronic device may include further broadcasting a first request signal using the third battery power.

In the method according to an example embodiment, the first electronic device may include further identifying whether the first battery is greater than or equal to the specified value, broadcasting a first request signal in a first period in response to being greater than or equal to the specified value, and broadcasting the first request signal in a second period in response to being less than the specified value.

In the method according to an example embodiment, the first electronic device may include further reidentifying the first battery and the second battery, determining the second electric device as the main electronic device in response to the remaining capacity of the second battery being greater than or equal to the remaining capacity of the first battery, switching to a power saving mode in which the second electronic device does not perform an operation other than a designated function in the lost mode, and the second electronic device may include further switching to a lost mode in which a first request signal is broadcast at a designated period.

In the method according to an example embodiment, the first electronic device may include further receiving a first response signal from the first external electronic device, identifying whether the strength of the first response signal received from the first external electronic device is greater than or equal to the predetermined value, outputting an alarm at a first decibel in response to being greater than or equal to the specified value, and outputting an alarm at a second decibel in response to being less than the specified value, wherein the first decibel may be less than the second decibel.

In the method according to an example embodiment, the first electronic device may include further receiving information related to the opening of the charging case from the charging case, transmitting a second request signal to the first external electronic device, and deactivating the lost mode in response to the first electronic device receiving the second response signal from the first external electronic device.

In the method of an example embodiment, the charging case may include further transmitting a wakeup signal to the first electronic device by being activated at every designated period using a timer, broadcasting a first request signal in response to the first electronic device receiving the wakeup signal and entering a power saving mode after the first electronic device broadcasting the signal.

In the method of an example embodiment, the second external electronic device may include further transmitting information related to a location of the second external electronic device to a server in response to receiving a first request signal broadcast by the first electronic device.

The electronic device according to an embodiment disclosed in this disclosure may be one of various types of electronic devices. The electronic devices may include, for example, a portable communication device (e.g., smart phone), a computer device, a portable multimedia device, a portable medical device, a camera, a wearable device, a home appliance, or the like. According to an embodiment of the present disclosure, the electronic devices are not limited to those described above.

An electronic device according to an example embodiment of the disclosure may reduce power consumption in the case of providing a finding function.

An electronic device according to an example embodiment of the disclosure may operate with low power in a lost mode, thereby extending use time.

An electronic device according to an example embodiment of the disclosure may receive power efficiently by directly connecting a battery of a charging case to the electronic device through a bypass circuit.

While disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the following disclosure, including the appended claims and their equivalents. It will also be understood that any of the embodiment(s) described herein may be used in conjunction with any other embodiment(s) described herein.

What is claimed is:

1. An electronic device system comprises:

a first electronic device;

a second electronic device; and a charging case, wherein, the first electronic device includes a first battery and a first processor;

the second electronic device includes a second battery and a second processor; and the charging case includes a third battery, a boost circuit configured to charge the first electronic device and/or the second electronic device with power of the third battery, and a bypass circuit configured to directly supply power from the third battery to the first electronic device and/or the second electronic device, wherein the first processor of the first electronic device is configured to:

identify whether the first electronic device and/or the second electronic device are/is mounted on the charging case;

identify a remaining capacity of the first battery and the second battery in response to the identification of being mounted and determine the first electronic device having a larger remaining battery capacity as a main electronic device;

transmit a first request signal to a first external electronic device;

switch to a lost mode to broadcast a first request signal at a specified period in response to a strength of a first response signal received from the first external electronic device; and transmit information related to the lost mode to the charging case, the second electronic device is configured to switch to a power saving mode in which the second electronic device does not perform an operation other than a designated function, and the charging case being configured to connect the third battery and the bypass circuit based on information related to the lost mode and to provide the power of the third battery to the first electronic device using the bypass circuit.

2. The electronic device system of claim 1, wherein the charging case comprises further a power line communication (PLC) circuit, the first electronic device further comprising a PLC circuit, wherein information is configured to be transmitted and received through the PLC circuit of the first electronic device and the PLC circuit of the charging case.

3. The electronic device system of claim 1, wherein the first electronic device further comprises a switch configured to selectively connect the first processor of the first electronic device and the first battery, or the first processor of the first electronic device and the bypass circuit, and the charging case is configured to request the first electronic device to activate a connection between the first processor of the first electronic device and the bypass circuit and to supply power of the third battery to the first processor through the bypass circuit in response to the activation of the connection.

4. The electronic device system of claim 3, wherein the first electronic device is configured to broadcast a first request signal using the power of the third battery.

5. The electronic device system of claim 1, wherein the first electronic device is configured to: identify whether the first battery is greater than or equal to a specified value, broadcast a first request signal in a first period in response to the first battery being greater than or equal to the specified value, and broadcast a first request signal in a second period in response to the first battery being less than the specified value.

6. The electronic device system of claim 1, wherein the first electronic device is configured to: reidentify the first battery and the second battery, determine the second electronic device as a main electronic device in response to the remaining capacity of the second battery being greater than or equal to the remaining capacity of the first battery, and switch to a power saving mode in which the second electronic device does not perform an operation other than a designated function in a lost mode, wherein the second electronic device is configured to switch to a lost mode in which a first request signal is broadcast at a designated period.

7. The electronic device system of claim 1, wherein the first electronic device is configured to: receive a first response signal from the first external electronic device, identify whether the strength of the first response signal received from the first external electronic device is greater than or equal to a specified value, output an alarm with a first decibel in response to the strength of the first response signal being greater than or equal to the specified value, and output an alarm with a second decibel in response to the strength of the first response signal being less than the specified value, wherein the first decibel may be less than the second decibel.

8. The electronic device system of claim 1, wherein the first electronic device is configured to: receive information related to opening of the charging case from the charging case, transmit a second request signal to the first external electronic device, and deactivate the lost mode in response to receiving a second response signal from the first external electronic device.

9. The electronic device system of claim 1, wherein the charging case further comprises a timer, the timer configured to be activated at every designated period and to transmit a wakeup signal to the first electronic device, wherein the first electronic device is configured to be activated in response to receiving the wakeup signal, to broadcast the first request signal, and to enter a power saving mode after broadcasting the first request signal.

10. The electronic device system of claim 1, further comprising a second external electronic device configured to transmit information related to a location of the second external electronic device to a server in response to receiving the first request signal broadcast by the first electronic device.

11. A method for operating an electronic device system, where the electronic device system includes a first electronic device, a second electronic device and a charging case, the method comprising:

identifying, by the first electronic device, whether the first electronic device and the second electronic device are mounted on the charging case;

identifying, by the first electronic device, a first battery of the first electronic device and a second battery of the second electronic device in response to the identification of being mounted and determining the first electronic device having a larger battery level as a main electronic device;

transmitting, by the first electronic device, a first request signal to a first external electronic device;

switching, by the first electronic device, to a lost mode to broadcast a first request signal at a specified period in response to a strength of a first response signal received from the first external electronic device being less than or equal to a specified value;

transmitting, by the first electronic device, information related to the lost mode to the charging case;

switching, by the second electronic device, to a power saving mode in which the second electronic device does not perform an operation other than a designated function; and connecting, by the charging case, a third battery and a bypass circuit based on information related to the lost mode and providing the power of the third battery to the first electronic device using the bypass circuit.

12. The method of claim 11, further comprising further transmitting and receiving, by the first electronic device, information through a power line communication (PLC) circuit of the first electronic device and a PLC circuit of the charging case.

13. The method of claim 11, further comprising: selectively connecting, by the first electronic device, a processor of the first electronic device and the first battery using a switch, or the processor of the first electronic device and the bypass circuit, and further requesting, by the charging case, the first electronic device to activate the connection between the processor of the first electronic device and the bypass circuit and supplying power of the third battery to the processor through the bypass circuit in response to the activation of the connection.

14. The method of claim 13, further comprising broadcasting, by the first electronic device, a first request signal using the third battery power.

15. The method of claim 11, further comprising: identifying, by the first electronic device, whether the first battery is greater than or equal to a specified value; broadcasting, by the first electronic device, a first request signal in a first period in response to the first battery being greater than or equal to the specified value; and broadcasting, by the first electronic device, the first request signal in a second period in response to the first battery being less than the specified value.

16. The method of claim 11, further comprising: reidentifying, by the first electronic device, the first battery and the second battery; determining, by the first electronic device, the second electric device as the main electronic device in response to a remaining capacity of the second battery being greater than or equal to a remaining capacity of the first battery; and switching, by the first electronic device, to a power saving mode in which the second electronic device does not perform an operation other than a designated function in the lost mode, the second electronic device further switching to a lost mode in which a first request signal is broadcast at a designated period.

17. The method of claim 11, further comprising: receiving, by the first electronic device, a first response signal from the first external electronic device; identifying, by the first electronic device, whether the strength of the first response signal received from the first external electronic device is greater than or equal to the specified value; outputting, by the first electronic device, an alarm at a first decibel in response to the strength of the first response signal being greater than or equal to the specified value; and outputting, by the first electronic device, an alarm at a second decibel in response to the strength of the first response signal being less than the specified value, wherein the first decibel is less than the second decibel.

18. The method of claim 11, further comprising: receiving, by the first electronic device, information related to an opening of the charging case from the charging case; transmitting a second request signal to the first external electronic device; and deactivating, by the first electronic device, the lost mode in response to the first electronic device receiving a second response signal from the first external electronic device.

19. The method of claim 11, further comprising: transmitting, by charging case, a wakeup signal to the first electronic device by being activated at every designated period using a timer; broadcasting, by the first electronic device, a first request signal in response to the first electronic device receiving the wakeup signal; and entering, by the first electronic device, a power saving mode after the first electronic device broadcasting the first request signal.

20. The method of claim 19, further comprising: transmitting, by a second external electronic device, information related to a location of the second external electronic device to a server in response to receiving the first request signal broadcast by the first electronic device.

* * * * *